United States Patent
Jiang et al.

(10) Patent No.: US 10,469,594 B2
(45) Date of Patent: Nov. 5, 2019

(54) IMPLEMENTATION OF SECURE SOCKET LAYER INTERCEPT

(71) Applicant: A10 Networks, Inc., San Jose, CA (US)

(72) Inventors: Xuyang Jiang, Saratoga, CA (US); Yang Yang, San Jose, CA (US); Ali Golshan, Palo Alto, CA (US)

(73) Assignee: A10 Networks, Inc., San Jose, CA (US)

( * ) Notice: Subject to any disclaimer, the term of this patent is extended or adjusted under 35 U.S.C. 154(b) by 304 days.

(21) Appl. No.: 14/962,058

(22) Filed: Dec. 8, 2015

(65) Prior Publication Data

US 2017/0163736 A1    Jun. 8, 2017

(51) Int. Cl.
  *H04L 29/08*    (2006.01)
  *H04L 29/06*    (2006.01)
  (Continued)

(52) U.S. Cl.
  CPC ............ *H04L 67/141* (2013.01); *G06F 21/00* (2013.01); *H04L 9/00* (2013.01); *H04L 63/0428* (2013.01);
  (Continued)

(58) Field of Classification Search
  CPC . H04L 67/141; H04L 63/0823; H04L 63/123; H04L 9/00; H04L 63/0428;
  (Continued)

(56) References Cited

U.S. PATENT DOCUMENTS 4,001,819 A    1/1977   Wise
4,780,905 A    10/1988  Cruts et al.
(Continued)

FOREIGN PATENT DOCUMENTS

TW    477140 B    2/2002
TW    574655 B    2/2004
(Continued)

OTHER PUBLICATIONS

Jarmoc, Jeff. "SSL/TLS Interception Proxies and Transitive Trust:" SSL/TLS Interception Proxies and Transitive Trust, Mar. 21, 2012 , Accessed Jun. 20, 2019, pdfs.semanticscholar.org/bd1e/35fc81e8d3d1751f1d7443fef2dfdbdc2394.pdf. (Year: 2012).*

(Continued)

*Primary Examiner* — Saleh Najjar
*Assistant Examiner* — Feliciano S Mejia
(74) *Attorney, Agent, or Firm* — Keith Kline; The Kline Law Firm PC

(57) ABSTRACT

Provided are methods and systems for inspecting secure data. A system for inspecting secure data comprises a server facing module, and a client facing module in communication with the server facing module. The client facing module is operable to intercept a client request associated with the secure data to establish a secure connection with a server, establish a data traffic channel via the server facing module, and provide a control message to the server facing module via the data traffic channel. The control message includes an instruction to the server facing module to obtain a security certificate from the server. The security certificate is received from the server facing module via the data traffic channel. The security certificate is forged to establish the secure connection between the client and the client facing module. The client facing module sends unencrypted data to the server facing module via the data traffic channel.

17 Claims, 13 Drawing Sheets

(51) Int. Cl.
*H04N 21/222* (2011.01)
*G06F 21/00* (2013.01)
*H04L 9/00* (2006.01)
*H04N 21/647* (2011.01)

(52) U.S. Cl.
CPC ...... *H04L 63/0471* (2013.01); *H04L 63/0823* (2013.01); *H04L 63/123* (2013.01); *H04L 63/306* (2013.01); *H04L 67/28* (2013.01); *H04N 21/222* (2013.01); *H04L 63/0272* (2013.01); *H04L 63/166* (2013.01); *H04N 21/64707* (2013.01)

(58) Field of Classification Search
CPC ....... H04L 67/14; G06F 21/00; G06F 21/121; G06F 21/228; H04N 21/64707; H04N 21/222
USPC ....... 726/6, 26; 703/150, 182; 709/218, 219, 709/227
See application file for complete search history.

(56) References Cited

U.S. PATENT DOCUMENTS

| | | | |
|---|---|---|---|
| 5,101,402 A | 3/1992 | Chiu et al. | |
| 5,163,088 A | 11/1992 | LoCascio | |
| 5,359,659 A | 10/1994 | Rosenthal | |
| 5,414,833 A | 5/1995 | Hershey et al. | |
| 5,511,122 A | 4/1996 | Atkinson | |
| 5,584,023 A | 12/1996 | Hsu | |
| 5,684,875 A | 11/1997 | Ellenberger | |
| 5,757,908 A | 5/1998 | Cooper et al. | |
| 5,805,801 A | 9/1998 | Holloway et al. | |
| 5,835,727 A | 11/1998 | Wong et al. | |
| 5,892,903 A | 4/1999 | Klaus | |
| 5,905,859 A | 5/1999 | Holloway et al. | |
| 5,940,002 A | 8/1999 | Finn et al. | |
| 5,960,177 A | 9/1999 | Tanno | |
| 6,006,272 A | 12/1999 | Aravamudan et al. | |
| 6,170,061 B1 | 1/2001 | Beser | |
| 6,185,681 B1 | 2/2001 | Zizzi | |
| 6,205,115 B1 | 3/2001 | Ikebe et al. | |
| 6,219,706 B1 | 4/2001 | Fan et al. | |
| 6,237,036 B1 | 5/2001 | Ueno et al. | |
| 6,249,866 B1 | 6/2001 | Brundrett et al. | |
| 6,259,789 B1 | 7/2001 | Paone | |
| 6,347,376 B1 | 2/2002 | Attwood et al. | |
| 6,363,486 B1 | 3/2002 | Knapton, III | |
| 6,449,651 B1 | 9/2002 | Dorfman et al. | |
| 6,505,192 B1 | 1/2003 | Godwin et al. | |
| 6,539,435 B2 | 3/2003 | Bolmarcich et al. | |
| 6,553,005 B1 | 4/2003 | Skirmont et al. | |
| 6,578,147 B1 | 6/2003 | Shanklin et al. | |
| 6,594,780 B1 | 7/2003 | Shen et al. | |
| 6,715,081 B1 | 3/2004 | Attwood et al. | |
| 6,732,279 B2 | 5/2004 | Hoffman | |
| 6,735,702 B1 | 5/2004 | Yavatkar et al. | |
| 6,754,832 B1 | 6/2004 | Godwin et al. | |
| 6,757,822 B1 | 6/2004 | Feiertag et al. | |
| 6,779,117 B1 | 8/2004 | Wells | |
| 6,973,040 B1 | 12/2005 | Ricciulli | |
| 6,988,106 B2 | 1/2006 | Enderwick et al. | |
| 7,092,357 B1 | 8/2006 | Ye | |
| 7,149,892 B2 * | 12/2006 | Freed | H04L 63/0281 713/151 |
| 7,194,766 B2 | 3/2007 | Noehring et al. | |
| 7,200,760 B2 | 4/2007 | Riebe et al. | |
| 7,221,757 B2 | 5/2007 | Alao | |
| 7,234,161 B1 | 6/2007 | Maufer et al. | |
| 7,277,963 B2 | 10/2007 | Dolson et al. | |
| 7,372,809 B2 | 5/2008 | Chen et al. | |
| 7,392,241 B2 | 6/2008 | Lin et al. | |
| 7,409,712 B1 | 8/2008 | Brooks et al. | |
| 7,418,733 B2 | 8/2008 | Connary et al. | |
| 7,478,429 B2 | 1/2009 | Lyon | |
| 7,533,409 B2 | 5/2009 | Keane et al. | |
| 7,543,052 B1 | 6/2009 | Cesa Klein | |
| 7,577,833 B2 | 8/2009 | Lai | |
| 7,596,695 B2 | 9/2009 | Liao et al. | |
| 7,620,733 B1 | 11/2009 | Tzakikario et al. | |
| 7,665,138 B2 | 2/2010 | Song et al. | |
| 7,739,494 B1 | 6/2010 | McCorkendale et al. | |
| 7,823,194 B2 | 10/2010 | Shay | |
| 7,845,004 B2 | 11/2010 | Bardsley et al. | |
| 7,925,766 B2 | 4/2011 | Jayawardena et al. | |
| 7,953,855 B2 | 5/2011 | Jayawardena et al. | |
| 8,010,469 B2 | 8/2011 | Kapoor et al. | |
| 8,089,871 B2 | 1/2012 | Iloglu et al. | |
| 8,220,056 B2 | 7/2012 | Owens, Jr. | |
| 8,239,670 B1 | 8/2012 | Kaufman et al. | |
| 8,276,203 B2 | 9/2012 | Nakhre et al. | |
| 8,286,227 B1 | 10/2012 | Zheng | |
| 8,301,802 B2 | 10/2012 | Wei et al. | |
| 8,375,453 B2 | 2/2013 | Jackson et al. | |
| 8,438,628 B2 * | 5/2013 | Shah | H04L 63/0428 380/255 |
| 8,448,245 B2 | 5/2013 | Banerjee et al. | |
| 8,473,620 B2 * | 6/2013 | Demmer | H04L 41/12 709/227 |
| 8,478,708 B1 | 7/2013 | Larcom | |
| 8,543,805 B2 * | 9/2013 | Ovsiannikov | H04L 29/08792 713/150 |
| 8,595,845 B2 | 11/2013 | Basavapatna et al. | |
| 8,706,877 B2 * | 4/2014 | Sundarrajan | H04L 63/0428 370/352 |
| 8,707,043 B2 * | 4/2014 | Wason | H04L 9/3273 380/229 |
| 8,719,446 B2 | 5/2014 | Spatscheck et al. | |
| 8,800,034 B2 | 8/2014 | McHugh et al. | |
| 8,813,228 B2 | 8/2014 | Magee et al. | |
| 8,832,832 B1 | 9/2014 | Visbal | |
| 8,881,284 B1 | 11/2014 | Gabriel | |
| 8,948,380 B2 | 2/2015 | Goto | |
| 9,129,116 B1 | 9/2015 | Wiltzius | |
| 9,130,996 B1 | 9/2015 | Martini | |
| 9,215,208 B2 | 12/2015 | Fraize et al. | |
| 9,245,121 B1 | 1/2016 | Luo et al. | |
| 9,246,926 B2 | 1/2016 | Erlingsson et al. | |
| 9,294,503 B2 | 3/2016 | Thompson et al. | |
| 9,300,623 B1 | 3/2016 | Earl et al. | |
| 9,537,886 B1 | 1/2017 | Gareau | |
| 9,565,180 B2 * | 2/2017 | Yerra | H04L 9/3265 |
| 9,584,318 B1 | 2/2017 | Yang et al. | |
| 9,705,852 B2 * | 7/2017 | Bollay | H04L 63/166 |
| 9,769,149 B1 * | 9/2017 | Brady | H04L 63/0823 |
| 9,800,602 B2 * | 10/2017 | Shekyan | H04L 63/1433 |
| 9,923,897 B2 * | 3/2018 | Houston | H04L 63/10 |
| 2001/0042204 A1 | 11/2001 | Blaker et al. | |
| 2002/0087708 A1 | 7/2002 | Low et al. | |
| 2002/0108059 A1 | 8/2002 | Canion et al. | |
| 2002/0165912 A1 | 11/2002 | Wenocur et al. | |
| 2002/0188839 A1 | 12/2002 | Noehring et al. | |
| 2003/0023846 A1 | 1/2003 | Krishna et al. | |
| 2003/0023876 A1 | 1/2003 | Bardsley et al. | |
| 2003/0028585 A1 | 2/2003 | Yeager et al. | |
| 2003/0035547 A1 | 2/2003 | Newton | |
| 2003/0061507 A1 | 3/2003 | Xiong et al. | |
| 2003/0069973 A1 | 4/2003 | Ganesan et al. | |
| 2003/0123667 A1 | 7/2003 | Weber et al. | |
| 2003/0196081 A1 | 10/2003 | Savarda et al. | |
| 2003/0200456 A1 | 10/2003 | Cyr et al. | |
| 2004/0008711 A1 | 1/2004 | Lahti et al. | |
| 2004/0054807 A1 | 3/2004 | Harvey et al. | |
| 2004/0057579 A1 | 3/2004 | Fahrny | |
| 2004/0059951 A1 | 3/2004 | Pinkas et al. | |
| 2004/0059952 A1 | 3/2004 | Newport et al. | |
| 2004/0091114 A1 | 5/2004 | Carter et al. | |
| 2004/0093524 A1 | 5/2004 | Sakai | |
| 2004/0111635 A1 | 6/2004 | Boivie et al. | |
| 2004/0148520 A1 | 7/2004 | Talpade et al. | |
| 2004/0172538 A1 | 9/2004 | Satoh et al. | |
| 2004/0187032 A1 | 9/2004 | Gels et al. | |
| 2005/0021999 A1 | 1/2005 | Touitou et al. | |

(56) References Cited

U.S. PATENT DOCUMENTS

| | | |
|---|---|---|
| 2005/0041584 A1 | 2/2005 | Lau et al. |
| 2005/0044068 A1 | 2/2005 | Lin et al. |
| 2005/0044352 A1 | 2/2005 | Pazi et al. |
| 2005/0125684 A1 | 6/2005 | Schmidt |
| 2005/0180416 A1 | 8/2005 | Jayawardena et al. |
| 2005/0193199 A1 | 9/2005 | Asokan et al. |
| 2005/0198099 A1 | 9/2005 | Motsinger et al. |
| 2005/0235145 A1 | 10/2005 | Slick et al. |
| 2005/0257093 A1 | 11/2005 | Johnson et al. |
| 2005/0278527 A1 | 12/2005 | Liao et al. |
| 2006/0056297 A1 | 3/2006 | Bryson et al. |
| 2006/0061507 A1 | 3/2006 | Mohamadi |
| 2006/0143707 A1 | 6/2006 | Song et al. |
| 2006/0179319 A1 | 8/2006 | Krawczyk |
| 2006/0185014 A1 | 8/2006 | Spatscheck et al. |
| 2006/0230444 A1 | 10/2006 | Iloglu et al. |
| 2006/0265585 A1 | 11/2006 | Lai |
| 2007/0143769 A1 | 6/2007 | Bu et al. |
| 2007/0169194 A1 | 7/2007 | Church et al. |
| 2007/0186282 A1 | 8/2007 | Jenkins |
| 2007/0199061 A1* | 8/2007 | Byres ............... H04L 41/0806 726/11 |
| 2007/0214088 A1 | 9/2007 | Graham et al. |
| 2007/0280114 A1 | 12/2007 | Chao et al. |
| 2007/0283429 A1 | 12/2007 | Chen et al. |
| 2008/0183885 A1 | 7/2008 | Durrey et al. |
| 2008/0256623 A1 | 10/2008 | Worley et al. |
| 2009/0077663 A1 | 3/2009 | Sun et al. |
| 2009/0083537 A1* | 3/2009 | Larsen ............... H04L 63/0281 713/153 |
| 2009/0168995 A1 | 7/2009 | Banga et al. |
| 2010/0131646 A1 | 5/2010 | Drako |
| 2010/0138921 A1 | 6/2010 | Na et al. |
| 2010/0284300 A1 | 11/2010 | Deshpande et al. |
| 2011/0082947 A1 | 4/2011 | Szeto et al. |
| 2011/0093785 A1 | 4/2011 | Lee et al. |
| 2011/0131646 A1 | 6/2011 | Park et al. |
| 2011/0153744 A1 | 6/2011 | Brown |
| 2011/0188452 A1 | 8/2011 | Borleske et al. |
| 2011/0249572 A1 | 10/2011 | Singhal et al. |
| 2011/0282997 A1 | 11/2011 | Prince et al. |
| 2012/0036272 A1 | 2/2012 | El Zur |
| 2012/0042060 A1 | 2/2012 | Jackowski et al. |
| 2012/0096546 A1 | 4/2012 | Dilley et al. |
| 2012/0110472 A1 | 5/2012 | Amrhein et al. |
| 2012/0144461 A1 | 6/2012 | Rathbun |
| 2012/0155274 A1 | 6/2012 | Wang et al. |
| 2012/0159623 A1 | 6/2012 | Choi |
| 2012/0163186 A1 | 6/2012 | Wei et al. |
| 2012/0170753 A1 | 7/2012 | Pandrangi et al. |
| 2012/0173684 A1 | 7/2012 | Courtney et al. |
| 2012/0174196 A1 | 7/2012 | Bhogavilli et al. |
| 2012/0227109 A1 | 9/2012 | Dimuro |
| 2012/0250866 A1 | 10/2012 | Matsuo |
| 2012/0260329 A1 | 10/2012 | Suffling |
| 2012/0266242 A1 | 10/2012 | Yang et al. |
| 2013/0019025 A1 | 1/2013 | Chaturvedi et al. |
| 2013/0103834 A1 | 4/2013 | Dzerve et al. |
| 2013/0139245 A1 | 5/2013 | Thomas |
| 2013/0198845 A1 | 8/2013 | Anvari |
| 2013/0212265 A1 | 8/2013 | Rubio Vidales et al. |
| 2013/0227646 A1 | 8/2013 | Haggerty et al. |
| 2013/0243194 A1 | 9/2013 | Hawkes et al. |
| 2013/0263256 A1 | 10/2013 | Dickinson et al. |
| 2014/0137190 A1 | 5/2014 | Carey et al. |
| 2014/0269308 A1 | 9/2014 | Oshiba |
| 2014/0280832 A1 | 9/2014 | Oshiba |
| 2014/0325588 A1 | 10/2014 | Jalan et al. |
| 2014/0325648 A1 | 10/2014 | Liu et al. |
| 2014/0344925 A1 | 11/2014 | Muthiah |
| 2015/0033341 A1 | 1/2015 | Schmidtler et al. |
| 2015/0058977 A1 | 2/2015 | Thompson et al. |
| 2015/0143118 A1 | 5/2015 | Sheller et al. |
| 2015/0220745 A1 | 8/2015 | Nellitheertha et al. |
| 2015/0281177 A1 | 10/2015 | Sun |
| 2016/0036651 A1 | 2/2016 | Sureshchandra et al. |
| 2016/0134655 A1 | 5/2016 | Thompson et al. |
| 2016/0182509 A1 | 6/2016 | Kantecki et al. |
| 2016/0226896 A1 | 8/2016 | Bhogavilli et al. |

FOREIGN PATENT DOCUMENTS

| | | |
|---|---|---|
| TW | NI197237 | 2/2004 |
| TW | I225999 B | 1/2005 |
| TW | I241818 B | 10/2005 |
| TW | I252976 B | 4/2006 |
| WO | WO1998042108 | 9/1998 |
| WO | WO1999048303 A2 | 9/1999 |
| WO | WO2000062167 A1 | 10/2000 |
| WO | WO2006039529 A2 | 4/2006 |
| WO | WO2014150617 A1 | 9/2014 |
| WO | WO2014151072 A1 | 9/2014 |
| WO | WO2014176461 A1 | 10/2014 |
| WO | WO2015030977 A1 | 3/2015 |

OTHER PUBLICATIONS

Oracle Corporation. Oracle Intelligent Agent User's Guide, Release 9.2.0, Part No. A96676-01. Mar. 2002.

SOL11243. iRules containing the Rule_INIT iRule event do not re-initialize when a syntax error is corrected. f5. support.com. May 24, 2010.

Mutz, "Linux Encryption How to," available at http://encryptionhowto.sourceforge.net/Encryption-HOWTO-1.html, Oct. 4, 2000.

Ganesan et al., "YAPPERS: a peer-to-peer lookup service over arbitrary topology," IEEE, pp. 1250-1260, Mar. 30-Apr. 3, 2003.

Annexstein et al., "Indexing Techniques for File Sharing in Scalable Peer-to-Peer Networks," IEEE, pp. 10-15, Oct. 14-16, 2002.

Ling et al., "A Content-Based Resource Location Mechanism in PeerIS," IEEE, pp. 279-288, Dec. 12-14, 2002.

Obimo et al., "A parallel algorithm for determining the inverse of a matrix for use in blockcipher encryption/decryption," Journal of Supercomputing, vol. 39, No. 2, pp. 113-130, Feb. 2007.

Long et al., "ID-based threshold decryption secure against adaptive chosen-ciphertext attack," Computers and Electrical Engineering, vol. 33, No. 3, pp. 166-176, May 2007.

Popek, Gerald J., "Encryption and Secure Computer Networks," Computing Surveys, vol. 11, No. 4, pp. 1-26, Dec. 1979.

Dainotti, Albert et al. TIE: A Community-Oriented Traffic Classification Platform. May 11, 2009. Springer-Verlag, Traffic Monitoring and Analysis: Proceedings First International Workshop, TMA 2009. pp. 64-74. Retrieved from: Inspec. Accession No. 11061142.

Dainotti, Albert et al. "Early Classification of Network Traffic through Multi-Classification." Apr. 27, 2011. Springer Verlag, Traffic Monitoring and Analysis, Proceedings of the Third International Workshop, TMA 2011. pp. 122-135. Retrieved from INSPEC. Accession No. 12232145.

Liebergeld, Steffen et al. "Cellpot: A Concept for Next Generation Cellular Network Honeypots," Internet Society, Feb. 23, 2014, pp. 1-6.

Thanasegaran et al., "Simultaneous Analysis of Time and Space for Conflict Detection in Time-Based Firewall Policies," Jul. 2010, IEEE 10th International Conference on Computer and Information Technology, pp. 1015-1021.

Kaufman, Charlie et al., "DoS Protection for UDP-Based Protocols," CCS 2003, Oct. 27-31, 2003, pp. 2-7.

Castelluccia, Claude et al., "Improving Secure Server Performance by Re-balancing SSL/TLS Handshakes," ASIACCS 2006, Mar. 21-24, 2006, pp. 26-34.

"Network- vs. Host-based Intrusion Detection, a Guide to Intrusion Detection Technology", Oct. 2, 1998, Internet Security Systems [online], Retrieved from the Internet: <URL:http://documents.iss.net/whitepapers/nvh-ids.pdf>, 10 pages.

Hunt, Guerney D. H. et al., "Network Dispatcher: a connection router for scalable Internet services", 1998, Proceedings of the 7th International World Wide Web Conference (WWW7), Retrieved from the Internet: <URL:http://www.unizh.ch/home/mazzo/reports/www7conf/fullpapers/1899/com1899.htm>, 14 pages.

(56) References Cited

OTHER PUBLICATIONS

Spatscheck et al., "Optimizing TCP Forwarder Performance", IEEE/ACM Transactions on Networking, vol. 8, No. 2, Apr. 2000.
Lee, Patrick P. C. et al., "On the Detection of Signaling DoS Attacks on 3G Wireless Networks," IEEE INFOCOM 2007—26th IEEE International Conference on Computer Communications processings, May 6-12, 2007, pp. 1289-1297.

* cited by examiner

IMPLEMENTATION OF SECURE SOCKET LAYER INTERCEPT

TECHNICAL FIELD

This disclosure relates generally to computer and network security and, more particularly, to implementation of secure socket layer (SSL) intercept.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

An SSL is a cryptographic protocol designed for providing communication security over the Internet. Firewalls, Intrusion Prevention System (IPS), and Intrusion Detection System (IDS) security appliances can normally only inspect plain text traffic or clear text traffic and have difficulties in inspecting the SSL traffic because data packets of the SSL traffic are encrypted. Additionally, conventional Packet Capture forensic tools may be inefficient for inspecting the SSL traffic for malware, hidden threats, or for botnets. Therefore, in order to address security threats, clients may install interception proxy authority certificates in their local root stores. However, this approach is mostly used in a corporate environment.

The cryptography operations involved in SSL interceptions may be computationally intensive. Therefore, SSL interception technology can be implemented using a multiple devices solution. The multiple devices may include security appliances associated with the Firewall, the IPS, or the IDS. The multiple devices solution can distribute the loads between multiple devices and achieve higher overall performance. In case multiple devices are involved, the multiple devices may have to communicate with each other to perform certain tasks, such as to retrieve a security certificate. Conventionally, prior to establishing a secure communication connection, a separate control message connection may need to be established to fulfill the communication needs. The secure communication connection may be established immediately after the separate control message connection is established. However, such establishment of two connections may be classified to be a Distributed Denial of Service (DDoS) attack and, therefore, both the secure communication connection and the separate control message connection may be terminated by a DDoS mitigation device.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure is related to approaches for inspecting secure data. Specifically, a system for inspecting secure data may comprise a server facing module and a client facing module in communication with the server facing module. The client facing module may be operable to intercept a client request associated with the secure data to establish a secure connection with a server. The client facing module may be further operable to establish a data traffic channel between the client facing module and the server via the server facing module. The client facing module may provide a control message to the server facing module via the data traffic channel. The control message may include an instruction to the server facing module to obtain a security certificate from the server. The client facing module may receive the security certificate from the server facing module via the data traffic channel. The security certificate may be forged to establish the secure connection between the client and the client facing module. The client facing module may send unencrypted data to the server facing module via the data traffic channel. The unencrypted data may be associated with the secure data. The unencrypted data may be inspected between the client facing module and the server facing module before being encrypted and sent to the server by the server facing module.

According to another approach of the present disclosure, there is provided a method for inspecting secure data. The method may commence with intercepting, by a client facing module, a client request associated with the secure data to establish a secure connection with a server. The method may continue with establishing a data traffic channel between the client facing module and the server via a server facing module. The method may further include providing, by the client facing module, a control message to the server facing module. The control message may include an instruction to the server facing module to obtain a security certificate from the server. The control message may be provided via the data traffic channel. The client facing module may receive the security certificate from the server facing module via the data traffic channel. The security certificate may be forged to establish the secure connection between the client and the client facing module. The method may further include sending, by the client facing module, unencrypted data to the server facing module via the data traffic channel. The unencrypted data may be associated with the secure data. The unencrypted data may be inspected between the client facing module and the server facing module before being encrypted and sent to the server by the server facing module.

In further example embodiments of the present disclosure, the method operations are stored on a machine-readable medium comprising instructions, which, when implemented by one or more processors, perform the recited operations. In yet further example embodiments, hardware systems or devices can be adapted to perform the recited operations. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
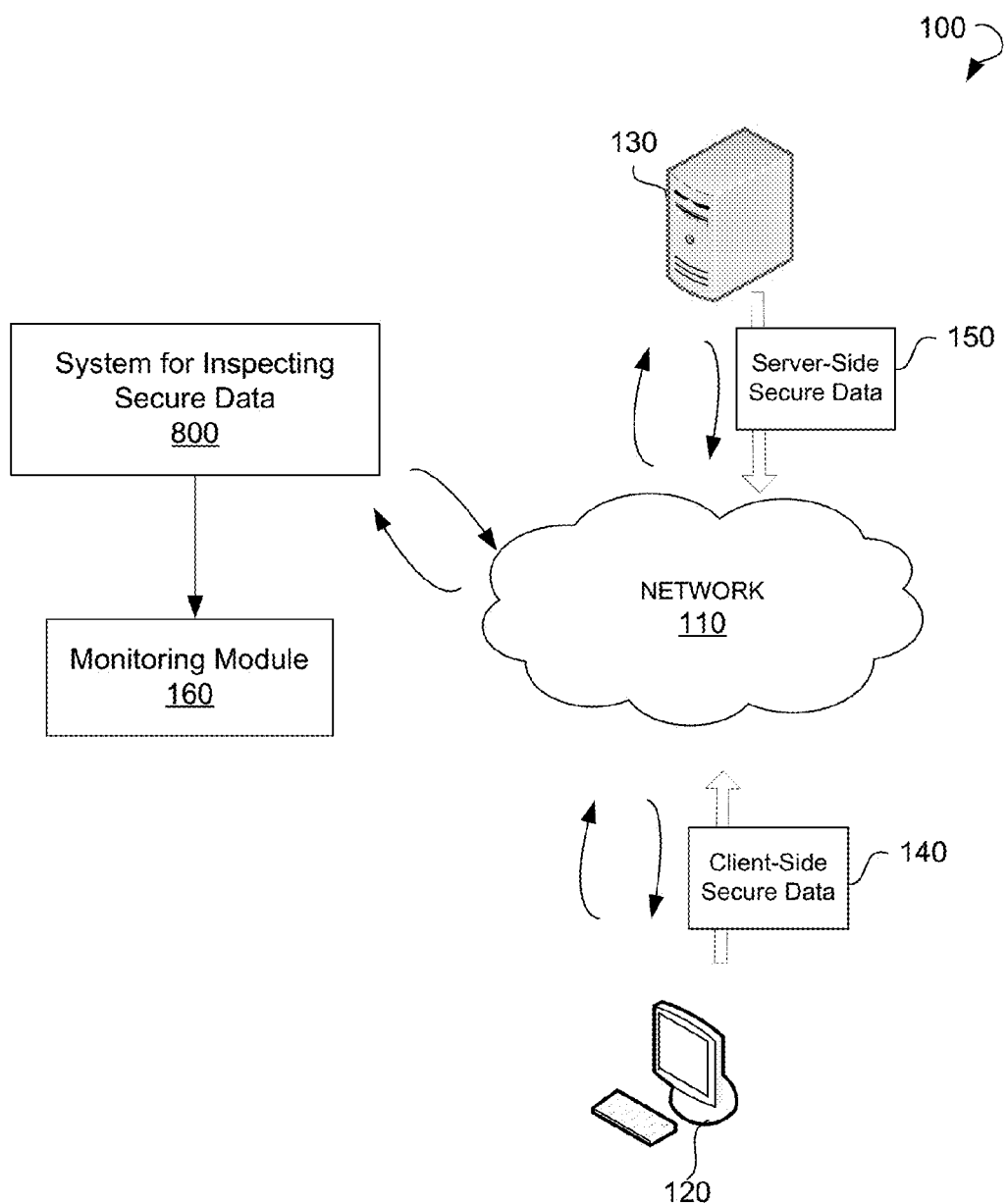
FIG. 1 shows an environment, within which methods and systems for inspecting secure data can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits, programmable logic devices, or various combinations thereof. In particular, the methods described herein may be implemented by a series of computer-executable instructions residing on a storage medium, such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

As outlined in the summary, the embodiments of the present disclosure are directed to inspection of secure data. A system for inspecting secure data can be responsible for intercepting and inspecting encrypted data packets communicated between a client and a server. According to the present disclosure, data traffic that goes between the client and the server is encrypted. Therefore, a monitoring module responsible for inspection of the data traffic for security threats and located in a path between the client and the server cannot inspect the data traffic.

The system for inspecting secure data may distribute the load caused by cryptography operations related to encrypted data traffic, such as SSL traffic, between several devices. More specifically, the system for inspecting secure data may include two modules, namely a client facing module and a server facing module, which can be implemented as virtual or physical machines. First, a Transmission Control Protocol (TCP) connection may be established between the client and the client facing module, the client facing module and the server facing module, and the server facing module and the server. Both the client facing module and the server facing module may be acting in an inspection mode. In case the client facing module intercepts a request of the client to establish a secure network session with the server, a Transport Layer Security (TLS) connection or an SSL connection may be initiated by the client facing module. More specifically, as the connection between the client facing module and the server facing module is already established, the client facing module may send a control message to the server facing module within the existing connection. The control message may instruct the server facing module to obtain a security certificate from the server. Upon receiving the control message, the server facing module may retrieve the security certificate from the server. The server facing module may provide the security certificate to the client facing module. The security certificate may be forged by the server facing module (upon receiving the security certificate from the server) or by the client facing module (upon receiving the security certificate from the server facing module) so that the client facing module may establish a secure connection with the client using the forged security certificate.

Upon providing the forged security certificate to the client, the client may send the secure data (e.g., an encrypted request). The client facing module may decrypt the secure data so that unencrypted data, e.g., a clear text, may be obtained. As used herein, "clear text" is the form of a message or data, which is sent or stored without cryptographic protection in a form that is understandable without additional processing. The unencrypted data may be provided to the monitoring module for inspection. After the inspection, the unencrypted data may be sent to the server facing module for re-encryption. Therefore, the secure data may be obtained. The server facing module may send the secure data to the server.

Therefore, no additional connections are established for sending the control message. The control message may be sent within the same connection as messages of a handshake procedure between the client and the server. Therefore, the control message does not carry any network session related information because the control message may be passed inside of the network session.

Firewall, IPS, IDS, and other security vendors can easily insert their security devices, namely monitoring modules, in the middle of each of the client-server and server-client connections. In particular, a monitoring module can be placed between the client facing module and the server facing module. Thus, the security devices can be used without any modifications to the SSL-to-clear text conversions.

Referring now to the drawings, FIG. 1 illustrates an environment 100 within which methods and systems for inspecting secure data can be implemented. The environment 100 may include a network 110, a client 120, a server 130, a system 800 for inspecting secure data, and a monitoring module 160. The client 120 may include a network machine or a network resource that sends client-side secure data 140 to the server 130. The server 130, in turn, may send server-side secure data 150 to the client 120. The client 120 and the server 130 may communicate with each other using the network 110.

The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking. The network 110 may include a network of data processing nodes that are interconnected for the purpose of data communication.

The monitoring module 160 may be a part of the system 800. The system 800 may intercept the client-side secure data 140 or the server-side secure data 150 and establish a secure network session between the client 120 and the server 130, perform encryption and decryption steps, and inspect the decrypted data for security threats via the monitoring module 160 as described in further detail below.

Figure 2:
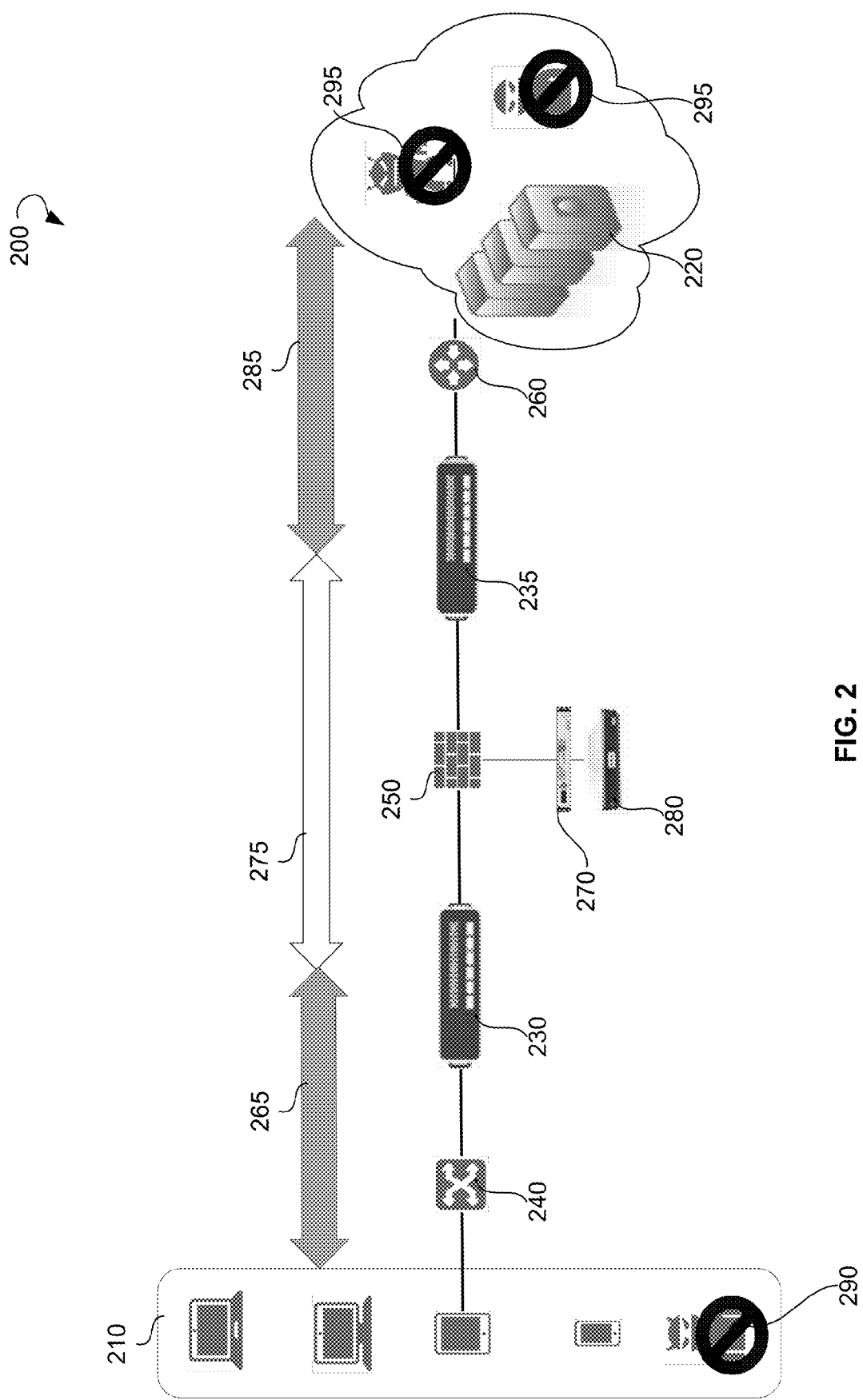
FIG. 2 is a schematic diagram of interception of SSL communications between clients and servers.

FIG. 2 is a schematic diagram 200 of interception of SSL communications between clients and servers. A client 210 and a server 220 may communicate with each other using an SSL encrypted connection. The outgoing traffic, or requests, of the client 210 may be directed by a switch 240 located within a client network to a client facing module 230. Similarly, the incoming traffic, or responses, of the server 220 may be directed by a router 260 to a server facing module 235.

The client facing module 230 may be responsible for decrypting the traffic and directing the decrypted traffic to a firewall 250 with further passing of the decrypted traffic to monitoring devices 270, 280. The firewall 250 may control the incoming traffic and the outgoing traffic. More specifically, the firewall 250 may not allow passage of data packets that do not match predetermined security criteria. The firewall 250 may send the requests of the client 210 and the responses of the server 220 to monitoring devices 270, 280. The monitoring devices 270, 280 may be responsible for malware detection and security forensics investigations related to the data packets of the incoming traffic and the outgoing traffic. When the incoming traffic or the outgoing traffic is the SSL traffic, i.e., is encrypted, neither the firewall 250, nor the monitoring devices 270, 280 can inspect the incoming traffic or the outgoing traffic. Therefore, both on a client side and a server side, attackers 290, 295 may take advantage of the fact that SSL traffic is not inspected and may send malicious data packets. Thus, the monitoring devices 270, 280 can inspect only the traffic decrypted by the client facing module 230.

The server facing module 235 may be responsible for receiving the inspected decrypted traffic from the firewall 250 and re-encrypting the traffic. Therefore, the encrypted traffic may be obtained and sent to the server 220.

Thus, in order to facilitate detection of malicious data packets in the incoming traffic and the outgoing traffic, the SSL encrypted connection between the client 210 and the server 220 may include a client-side SSL encrypted connection 265 and a server-side SSL encrypted connection 285. Specifically, the client 210 may send the outgoing traffic to the server 220 using the client-side SSL encrypted connection 265. Similarly, the server 220 may send the incoming traffic to the client 210 using the server-side SSL encrypted connection 285. Both the outgoing traffic and the incoming traffic may be intercepted and decrypted into clear text 275 for further inspection by the firewall 250 or the monitoring devices 270, 280.

Similarly, the server 220 may send the incoming traffic to the client 210 using the server-side SSL encrypted connection 285. The incoming traffic of the server 220 may be directed by the router 260 to the server facing module 235. The server facing module 235 may receive the incoming traffic from the server 220 and decrypt the incoming traffic. In an example embodiment, the decrypted traffic may be in the form of the clear text 275. The server facing module 235 may send the clear text 275 to the monitoring devices 270, 280 for inspection for malware or botnets. Upon inspection of the clear text 275, the monitoring devices 270, 280 may send the clear text 275 to the client facing module 230. The client facing module 230 may receive the clear text 275 and encrypt the clear text 275 to provide the encrypted incoming traffic from the server 220. The client facing module 230 may further send the encrypted incoming traffic to the client 210.

Figure 3:
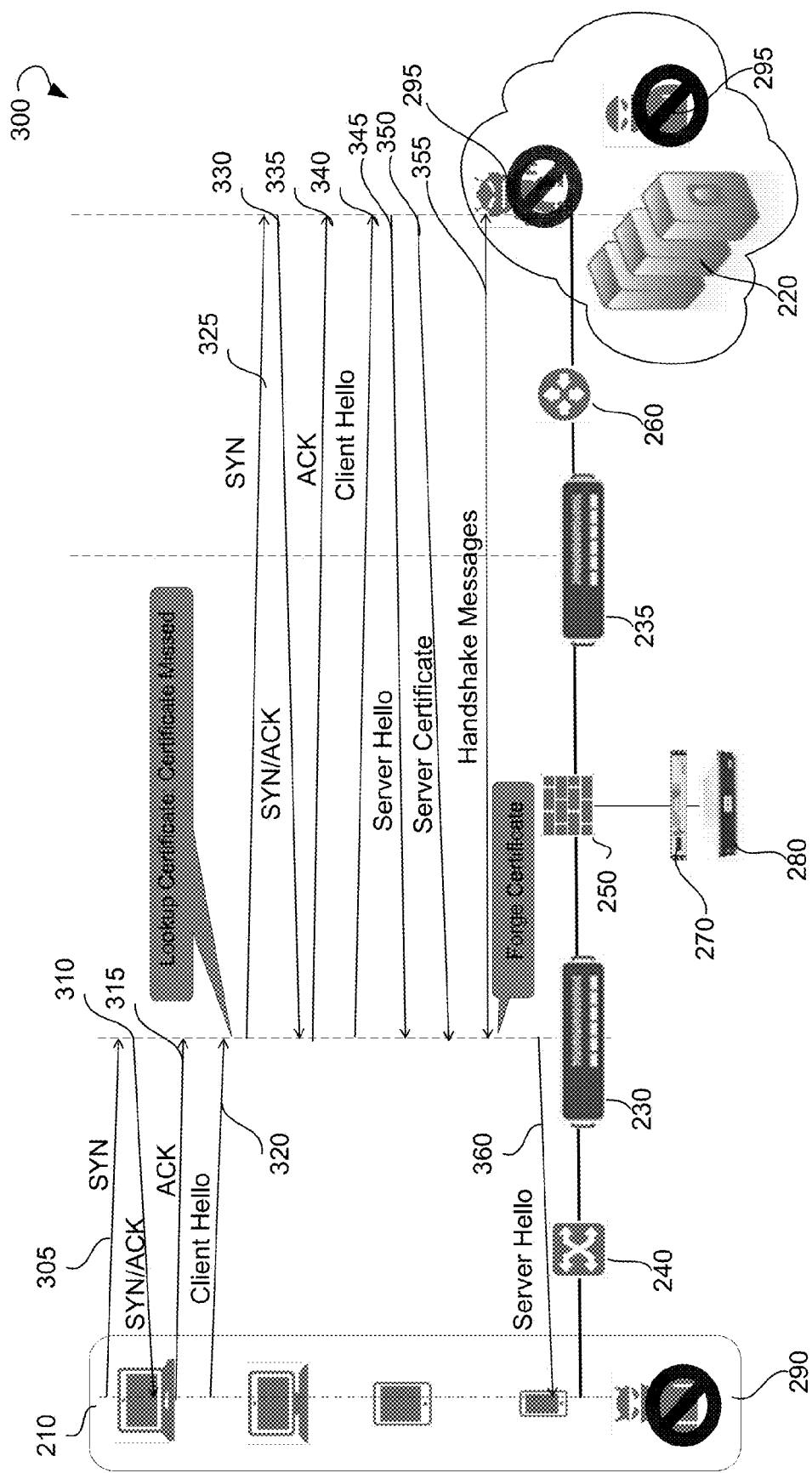
FIG. 3 is a schematic diagram showing an implementation of an SSL communication between clients and servers.

FIG. 3 is a diagram 300 of conventional implementation of an SSL communication between clients and servers, according to an example embodiment. Typically, an SSL session between the client and the server commences with a handshake procedure that includes a process of negotiation that dynamically sets parameters of a communications channel established between the client and the server. The establishment of the SSL session with interception of the data packet flow is described in further detail below.

According to an example embodiment, a client 210 sends a "SYNchronize" message 305 to a client facing module 230. The client facing module 230 receives the "SYNchronize" message 305 from the client 210 and sends a "SYNchronize-ACKnowledgement" message 310 to the client 210. The client 210 receives the "SYNchronize-ACKnowledgement" message 310 from the client facing module 230 and sends an "ACKnowledgement" message 315 to the client facing module 230. The client 210 further sends a "Client Hello" message 320 to the client facing module 230.

Upon receiving the "Client Hello" message 320 from the client 210, a TCP connection is established between the client 210 and the client facing module 230. Upon establishment of the TCP connection with the client 210, the client facing module 230 checks whether a security certificate associated with the server 220 is present in a database. The database can save security certificates based on Internet Protocol address, port number, Server Name Indication (SNI) of the server 220, and so forth. The SNI may be present in a "Client Hello" message sent by the client. Upon determining that the security certificate is missing in the database, a new connection (Transport Layer Security (TSL) connection) may be initialized by the client facing module 230 to retrieve a security certificate from a server 220. The new connection cannot be intercepted by the server facing module 235 because the server facing module 235 uses an old TCP port number (e.g., port 443). The client facing module 230 sends a "SYNchronize" message 325 to the server 220. The server 220 receives the "SYNchronize" message 325 from the client facing module 230 and sends a "SYNchronize-ACKnowledgement" message 330 to the client facing module 230. The client facing module 230 receives the "SYNchronize-ACKnowledgement" message 330 from the server 220 and sends an "ACKnowledgement" message 335 to the server 220. The client facing module 230 can further send a "Client Hello" message 340 to the server 220. In response to receiving the "Client Hello" message 340, the server 220 sends a "Server Hello" message 345 to the client facing module 230. The server 220 further sends a "Server Certificate" message 350 that includes the security certificate of the server 220. Furthermore, the server 220 sends other handshake messages 355 stipulated by the handshake procedure to the client facing module 230.

Furthermore, in an example embodiment, before sending the "Server Hello" message 345 to the client 210, the client facing module 230 may forge the security certificate associated with the server 220 and received in the "Server Certificate" message 350. The security certificate associated with the server 220 may be put into a security certificate cache by client facing module 230. In other words, the security certificate that the client 210 gets from the client facing module 230 is different from the security certificate provided by the server 220 to the client facing module 230. In an example embodiment, the certificate forging procedure is performed within a network of the organization. By using the certificate forging procedure, the organization may be able to monitor which type of traffic is initiated from clients inside the network of the organization to servers outside the network of the organization.

In an example embodiment, the certificate forging procedure is performed as follows. An issuer name of the certificate may be replaced with a SSL intercept Certification Authority (CA) name. The public key can be replaced with a SSL intercept CA public key, and most of the certificate extensions may be removed. The subject alternative name may be the only extension kept. Further, the certificate can be signed with the SSL intercept CA private key.

Upon forging of the security certificate and receiving all handshake messages 355 from the server 220, the client facing module 230 sends a "Server Hello" message 360 to the client 210. Additionally, the connection used to retrieve the security certificate can be removed.

Figure 4:
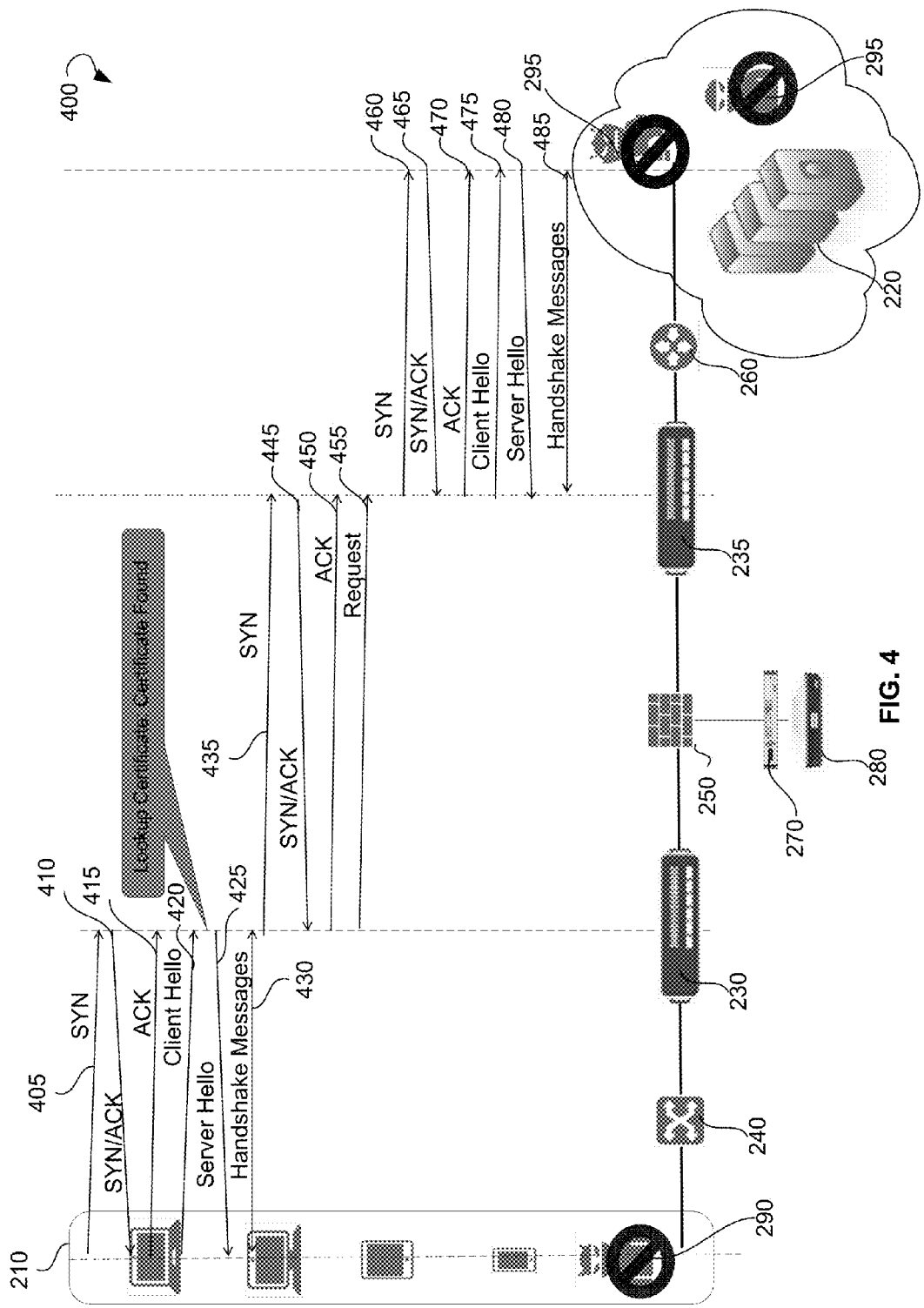
FIG. 4 is a schematic diagram showing an implementation of an SSL communication between clients and servers.

FIG. 4 is a diagram 400 of conventional implementation of an SSL communication between clients and servers, according to another example embodiment. A client 210 sends a "SYNchronize" message 405 to a client facing module 230. The client facing module 230 receives the "SYNchronize" message 405 from the client 210 and sends a "SYNchronize-ACKnowledgement" message 410 to the client 210. The client 210 receives the "SYNchronize-ACKnowledgement" message 410 from the client facing module 230 and sends an "ACKnowledgement" message 415 to the client facing module 230. The client 210 further sends a "Client Hello" message 420 to the client facing module 230.

Upon receiving the "Client Hello" message 320 from the client 210, the client facing module 230 checks whether a security certificate associated with the server 220 is present in a database. Upon determining that the security certificate is found in the database, the client facing module 230 sends a "Server Hello" message 425 based on the security certificate found in the database. Other handshake messages 430 may be sent between the client 210 and the client facing module 230.

Furthermore, a new TCP connection to the server facing module 235 is established, for example, by using a different port, such as port 8080. The client facing module 230 may send a "SYNchronize" message 435 to a server facing module 235. Upon receipt of the "SYNchronize" message 435, the server facing module 235 may send a "SYNchronize-ACKnowledgement" message 445 to the client facing module 230. The client facing module 230 receives the "SYNchronize-ACKnowledgement" message 445 from the server facing module 235 and sends an "ACKnowledgement" message 450 to the server facing module 235. The client facing module 230 can further send a request 455 to the server facing module 235. The server facing module 235 may start connecting to a server 220 by sending a "SYNchronize" message 460 to the server 220. Upon receipt of the "SYNchronize" message 460, the server 220 may send a "SYNchronize-ACKnowledgement" message 465 to the server facing module 235. The server facing module 235 receives the "SYNchronize-ACKnowledgement" message 465 from the server 220 and sends an "ACKnowledgement" message 470 to the server 220. The server facing module 235 further sends a "Client Hello" message 475 to the server 220. In response to receiving the "Client Hello" message 475, the server 220 sends a "Server Hello" message 480 to the server facing module 235. Furthermore, the server 220 sends other handshake messages 485 stipulated by a handshake procedure to the server facing module 235.

Though the implementations of the SSL communication shown on FIG. 3 and FIG. 4 can be advantageous for HyperText Transfer Protocol Secure traffic, they may be inefficient to support STARTTLS. STARTTLS is an extension to plain text communication protocols. STARTTLS offers a way to upgrade a plain text connection to an encrypted (TLS or SSL) connection instead of using a separate port for encrypted communication. In case of STARTTLS, some clear test message needs to flow before TLS connection starts. However, implementations of the SSL communication shown on FIG. 3 and FIG. 4 assume that the TLS connection starts right after the TCP connection is established. Therefore, a separate connection (TSL connection) needs to be established to retrieve a security certificate. The separate connection used to retrieve the security certificate may have footprints similar to those of the later TLS connection. Therefore, the TLS connection established after establishment of the separate connection and used for sending the encrypted data can be dropped by DDoS devices as a malicious connection.

Figure 5:
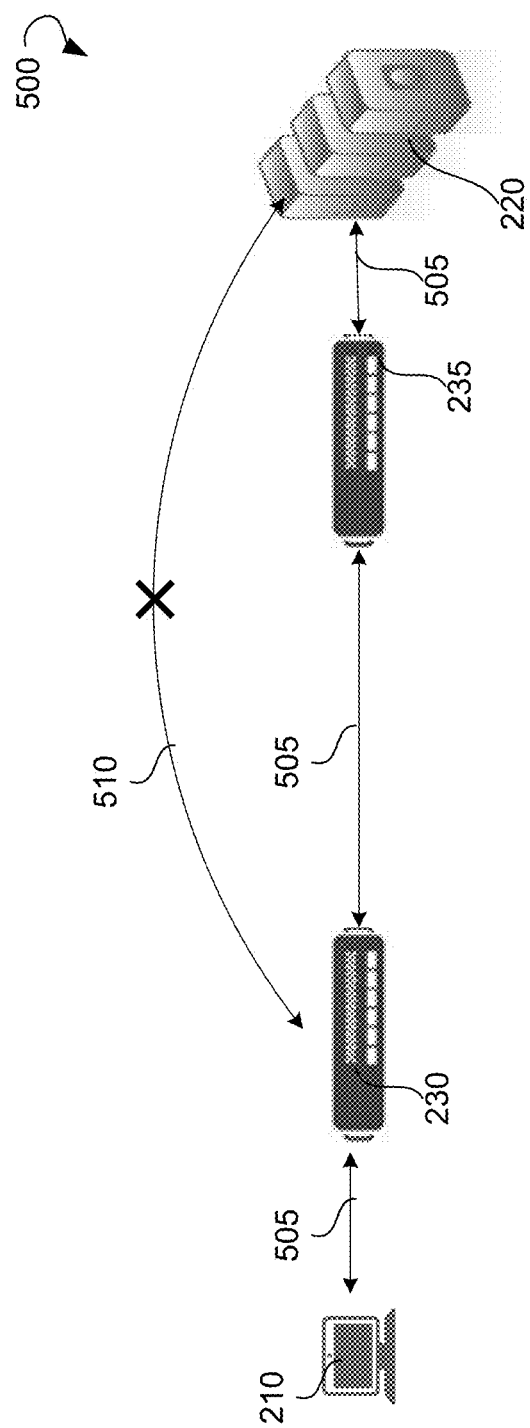
FIG. 5 is a diagram showing dropping a connection used for retrieving a security certificate.

FIG. 5 is a diagram 500 showing dropping of a connection used for retrieving a security certificate, according to an example embodiment. A connection 505 may be a TSL connection that may be initially established between a client 210 and a client facing module 230. A connection 510 is an additionally established TSL connection used for retrieval of the security certificate by the server facing module 235 from a server 220. Upon retrieval of the security certificate, the connection 510 may be dropped. The client facing module 230 may further communicate with a server facing module 235 to establish the connection 505 with the server facing module 235. The server facing module 235 can further establish the connection 505 with a server 220.

Figure 6:
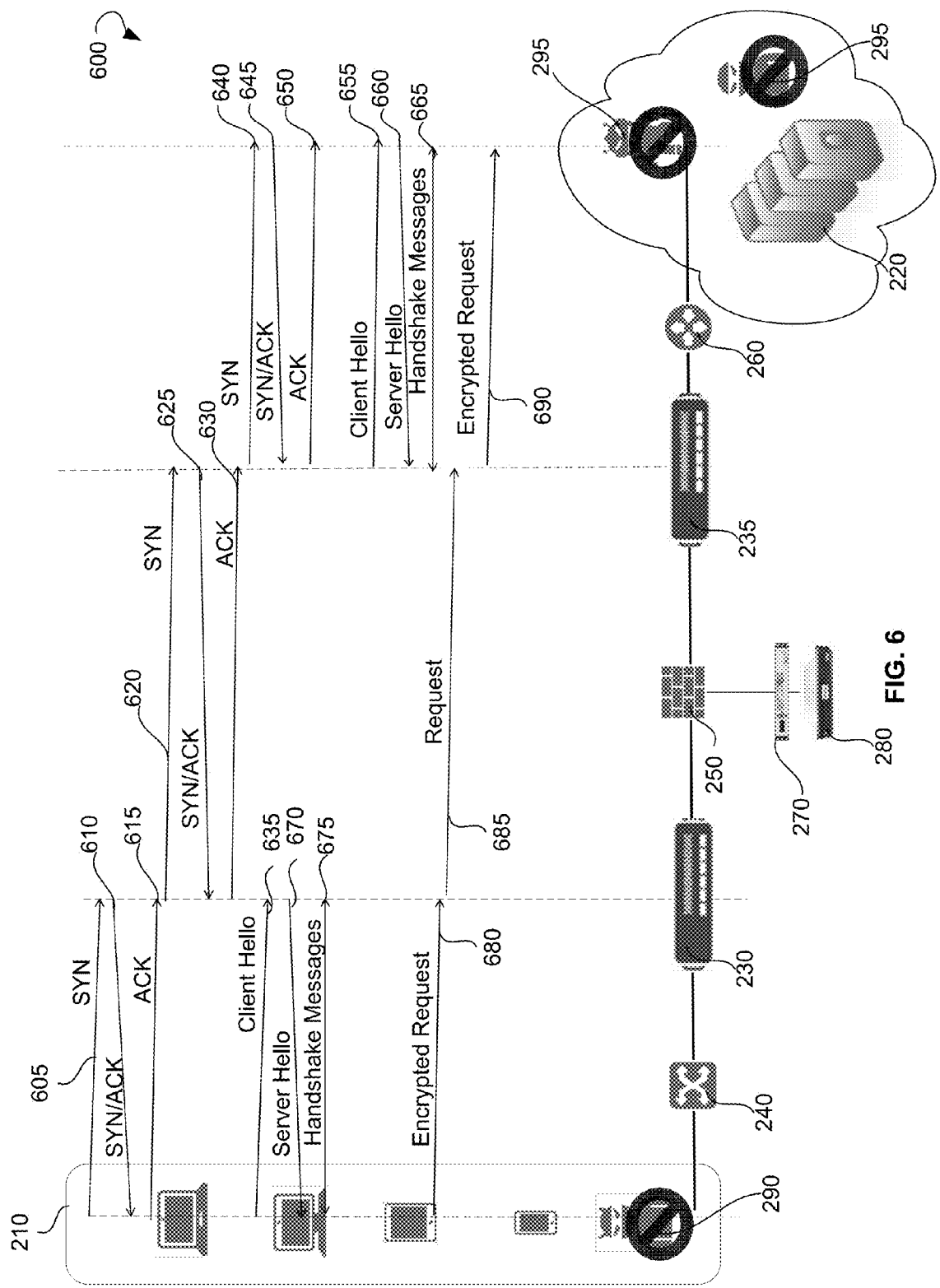
FIG. 6 is a diagram of implementation of an SSL communication between clients and servers.

FIG. 6 is a diagram 600 of implementation of an SSL communication between clients and servers by a system for inspecting secure data, according to an example embodiment. Before any TLS connection is initiated, all the TCP connections are already established. The TCP connections include a connection between a client 210 and a client facing module 230, a connection between the client facing module 230 and a server facing module 235, and a connection between the server facing module 235 and a server 220. Both the client facing module 230 and the server facing module 235 may be acting in an inspection mode.

Establishment of the TCP connection is shown in detail in FIG. 6. A client 210 sends a "SYNchronize" message 605 to a client facing module 230. The client facing module 230 receives the "SYNchronize" message 605 from the client 210 and sends a "SYNchronize-ACKnowledgement" message 610 to the client 210. The client 210 receives the "SYNchronize-ACKnowledgement" message 610 from the client facing module 230 and sends an "ACKnowledgement" message 615 to the client facing module 230. The client facing module 230 may further initiate connecting to a server facing module 235 by sending a "SYNchronize" message 620 to a server facing module 235. Upon receipt of the "SYNchronize" message 620, the server facing module 235 may send a "SYNchronize-ACKnowledgement" message 625 to the client facing module 230. The client facing module 230 receives the "SYNchronize-ACKnowledgement" message 625 from the server facing module 235 and sends an "ACKnowledgement" message 630 to the server facing module 235.

The server facing module 235 may start connecting to a server 220 by sending a "SYNchronize" message 640 to the server 220. Upon receipt of the "SYNchronize" message 640, the server 220 may send a "SYNchronize-ACKnowledgement" message 645 to the server facing module 235. The server facing module 235 receives the "SYNchronize-ACKnowledgement" message 645 from the server 220 and sends an "ACKnowledgement" message 650 to the server 220.

The client 210 may initialize the TSL connection by sending a "Client Hello" message 635 to the client facing module 230. Upon receipt of the "Client Hello" message 635 by the client facing module 230, the client facing module 230 may instruct the server facing module 235 to initiate the TSL connection with the server 220. The instruction can be provided using a control message (not shown) described in detail below in FIG. 9-10. Therefore, the server facing module 235 may send a "Client Hello" message 655 to the server 220. In response to receiving the "Client Hello" message 655, the server 220 sends a "Server Hello" message 660 to the server facing module 235. Furthermore, the server 220 sends other handshake messages 665 stipulated by a handshake procedure to the server facing device 235. The server facing module 235 may further communicate with the client facing module 230 with respect to the security certificate received from the server 220. The server facing module 235 may use the control message (not shown) to communicate the client facing module 230.

Thereafter, the client facing module 230 may send a "Server Hello" message 670 to the client 210. Additionally, the client 210 and the client facing module 230 send each other handshake messages 675 stipulated by the handshake procedure.

The client may further send an encrypted request 680 to the client facing module 230. The client facing module 230 may decrypt the encrypted request 680 and, upon inspection, send the inspected request 685 to the server facing module 235. The server facing module 235 may receive the request 685 and re-encrypt in to the encrypted request 690 to be sent to the server 220.

Figure 7:
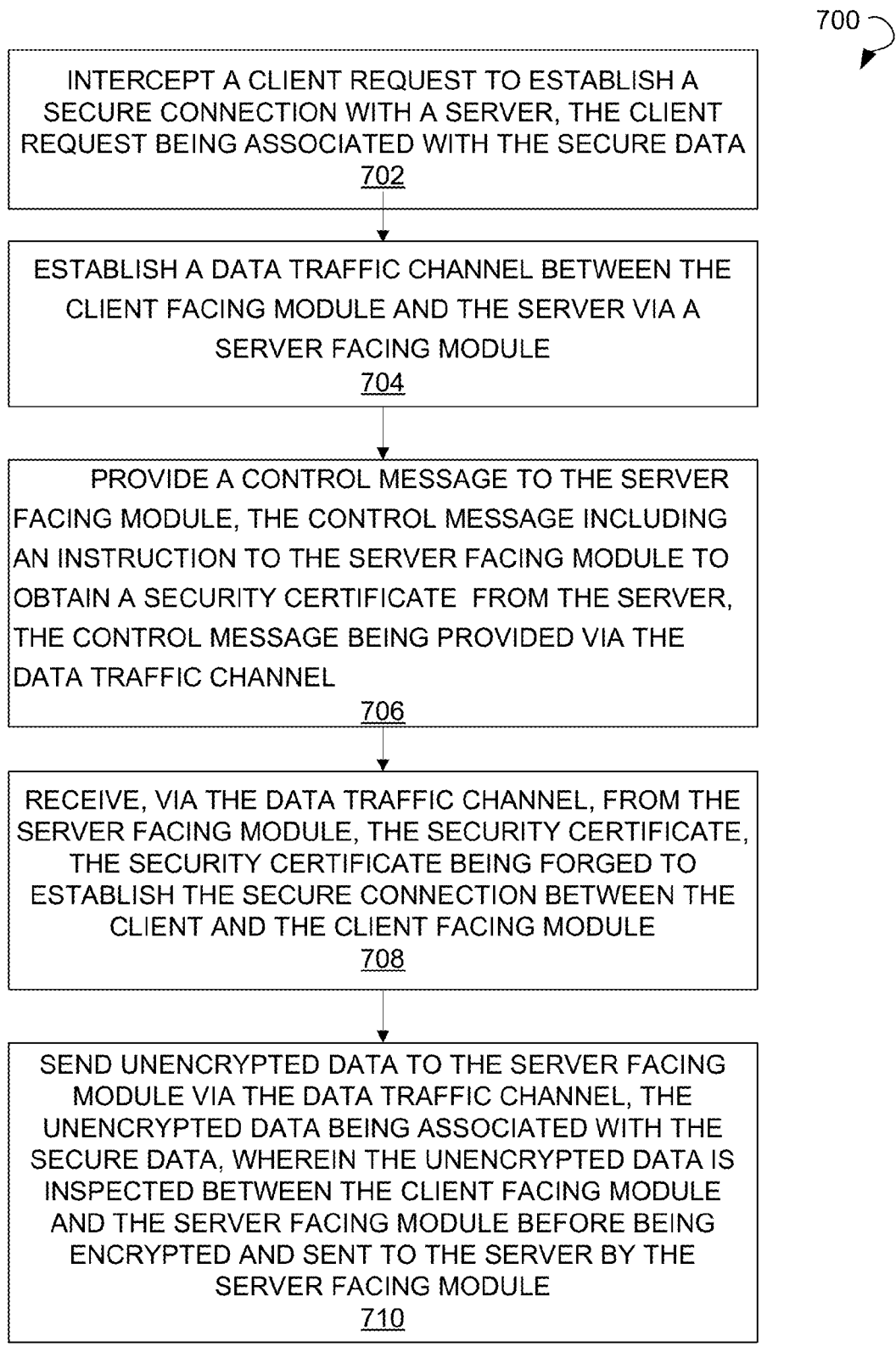
FIG. 7 is a process flow diagram of a method for inspecting secure data.

FIG. 7 shows a process flow diagram of a method 700 for inspecting secure data, according to an example embodiment. In some embodiments, the operations may be combined, performed in parallel, or performed in a different order. The method 700 may also include additional or fewer operations than those illustrated. The method 700 may be performed by processing logic that may comprise hardware (e.g., decision making logic, dedicated logic, programmable logic, and microcode), software (such as software run on a general-purpose computer system or a dedicated machine), or a combination of both.

The method 700 may commence with intercepting, by a client facing module, a client request to establish a secure connection with a server at operation 702. The client request may be associated with the secure data that the client may want to send to the server. In an example embodiment, the secure data may be encrypted according to an SSL protocol.

The method 700 may continue with operation 704, at which a data traffic channel may be established between the client facing module and the server via a server facing module.

At operation 706, the client facing module may provide a control message to the server facing module. The control message may include an instruction to the server facing module to obtain a security certificate from the server. The control message may be provided via the data traffic channel. In an example embodiment, the control message may identified by an application protocol parser. The application protocol parser may be installed on one or more of the client facing module and the server facing module and may be operable to identify the control message.

In a further example embodiment, the control message may be provided as an extension to an application protocol message. The application protocol message, such as XMPP, SMTP, or Post Office Protocol, may be sent between the client facing module and the server facing module.

The method 700 may continue with operation 708, at which the security certificate may be received by the client facing module from the server facing module via the data traffic channel. The security certificate may be forged to establish the secure connection between the client and the client facing module. In an example embodiment, forging of the security certificate may be performed by the client facing module upon receipt of the security certificate from the server facing module. According to another example embodiment, the security certificate may be forged by the server facing module upon receipt of the security certificate from the server. If the security certificate is forged by the server facing module, the server facing module may send a forged security certificate to the client facing module. Therefore, there may be no need for the client facing module to forge the security certificate because the security certificate received by the client facing module is the forged security certificate.

Alternatively, in some example embodiments, upon establishment of the data traffic channel between the client facing module and the server facing module, the client facing module may search for the security certificate associated with the server in a security certificate cache. In case the client and the server had connections in the past, the security certificate associated with the server may be stored in the security certificate cache. Additionally, a forged security certificate associated with the security certificate may be stored in the security certificate cache. Upon finding of the security certificate in the security certificate cache, the client facing module may forge the security certificate. If the forged security certificate is found in the security certificate cache, the client facing module may use the found forged security certificate. More specifically, the control message sent by the client facing module to the server facing device may include information that the client facing module already has the security certificate or the forged security certificate associated with the server. As the client facing module has the forged security certificate, the secure connection between the client and the client facing module may be established.

The method 700 may continue with operation 710, at which unencrypted data may be sent by the client facing module to the server facing module via the data traffic channel. The unencrypted data may be associated with the secure data. More specifically, the unencrypted data may be obtained by decryption of the secure data by the client facing module. The unencrypted data may be inspected between the client facing module and the server facing module before being encrypted and sent to the server by the server facing module. In an example embodiment, the unencrypted data may be provided to a monitoring module for inspection. More specifically, the monitoring module may inspect the unencrypted data for malware, hidden threads, infecting by botnets, and so forth. Upon inspection of the unencrypted data, the monitoring module may provide the unencrypted data to the server facing module. Before sending to the server, the unencrypted data may be encrypted by the server facing module to obtain the secure data. Thus, the server facing module may send the secure data to the server.

Figure 8:
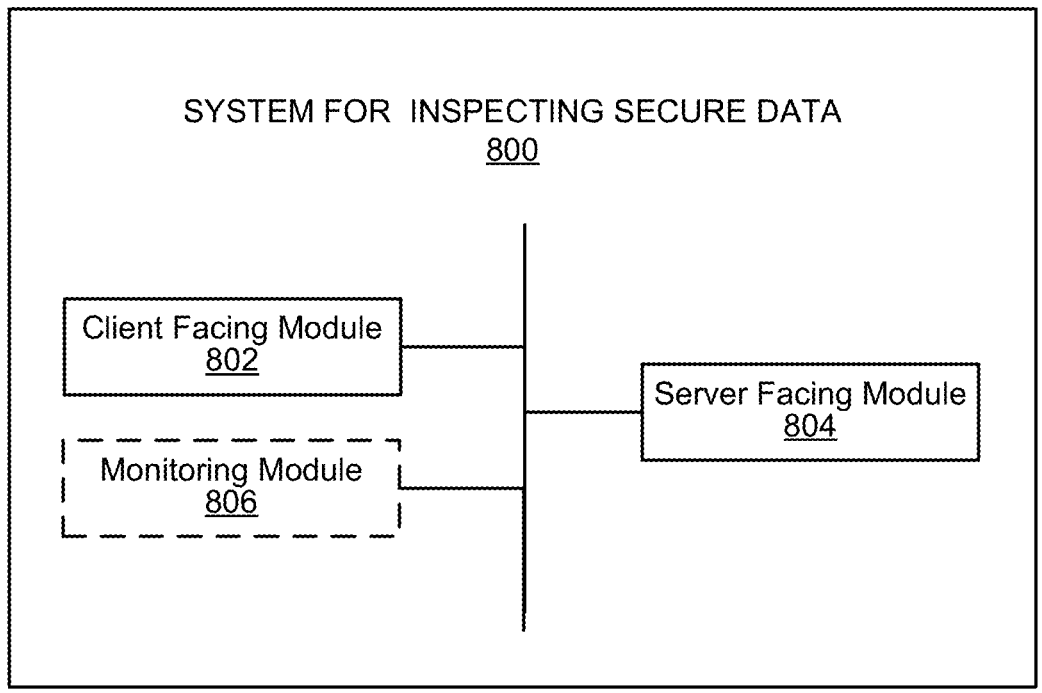
FIG. 8 is a block diagram illustrating a system for inspecting secure data.

FIG. 8 shows a block diagram illustrating various modules of an example system 800 for inspecting secure data. Specifically, the system 800 may include a client facing module 802, a server facing module 804, and optionally a monitoring module 806. In an example embodiment, the client facing module 802 and the server facing module 804 may include virtual machines and may run on different partitions of a single device. In a further example embodiment, the client facing module 802 and the server facing module 804 may be configured as physical devices. The monitoring module 806 may also be configured as a physical device or a virtual machine. In some embodiments, the monitoring module 806 may run on a partition of the single device on which the client facing module 802 and the server facing module 804 run.

The client facing module 802 may be operable to intercept a client request to establish a secure connection with a server. The client request may be associated with the secure data. The client facing module 802 may be further operable to establish a data traffic channel between the client facing module and the server via the server facing module.

Additionally, the client facing module 802 may be operable to provide a control message to the server facing module. The control message may include an instruction to the server facing module to obtain a security certificate from the server. The control message may be provided via the data traffic channel. In an example embodiment, the control message may be identified by an application protocol parser. The application protocol parser may be installed on one or more of the client facing module and the server facing module. In further embodiments, the control message may be provided as an extension to an application protocol message. The application protocol message may be sent between the client facing module and the server facing module.

The client facing module 802 may be further operable to receive the security certificate from the server facing module, via the data traffic channel. The security certificate may be forged to establish the secure connection between the client and the client facing module. The client facing module 802 may further decrypt the secure data to obtain unencrypted data. The client facing module 802 may be operable to send the unencrypted data to the server facing module via the data traffic channel. The unencrypted data may be associated with the secure data. The unencrypted data may be inspected between the client facing module and the server facing module before being encrypted and sent to the server by the server facing module.

Additionally, upon establishment of the data traffic channel between the client facing module and the server facing module, the client facing module 802 may be operable to search for the security certificate associated with the server in a security certificate cache. Upon finding of the security certificate in the security certificate cache, the client facing module 802 may forge the security certificate to provide the forged security certificate to the server facing module.

The server facing module 804 may be operable to receive the control message from the client facing module. Based on the control message, the server facing module 804 may request the security certificate from the server. Upon receiving of the security certificate from the server, the server facing module 804 may be operable to provide the security certificate to the client facing module. Additionally, upon receipt of the unencrypted data after the unencrypted data is inspected, the server facing module 804 may be operable to encrypt the unencrypted data. Furthermore, the server facing module 804 may be operable to send the secure data to the server.

In an example embodiment, if a request to establish a secure connection is sent by the server to the client, the server facing module 804 may be operable to perform functions of the client facing module 802 as described above. Similarly, the client facing module 802 may be operable to perform functions of the server facing module 804 as described above.

The monitoring module 806 may be operable to receive the unencrypted data from the client facing module 802, inspect the unencrypted data for malware, botnets, and the like, and provide the inspected unencrypted data to the server facing module 804.

Figure 9:
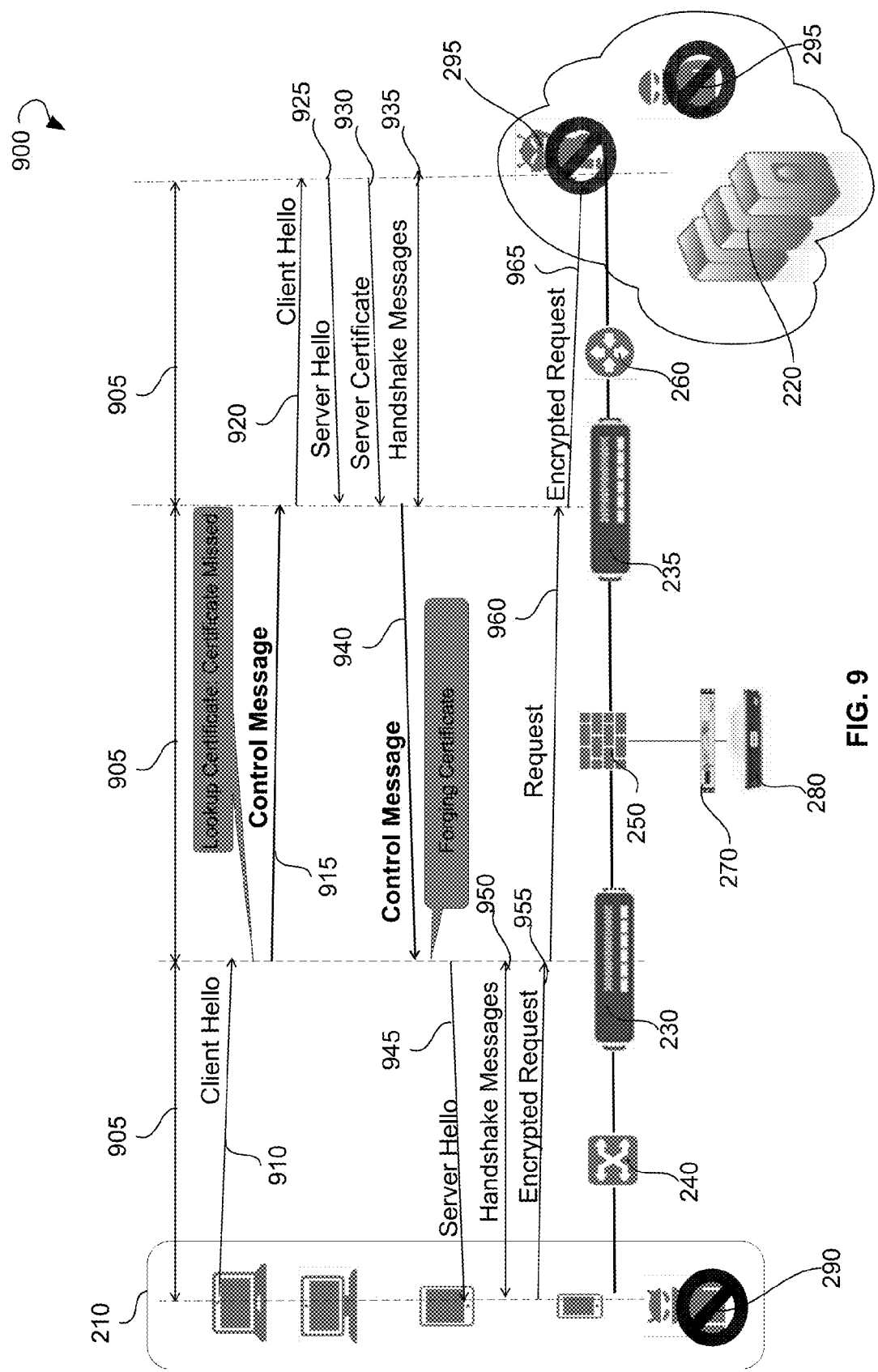
FIG. 9 is a diagram of implementation of an SSL communication between clients and servers by a system for inspecting secure data.

FIG. 9 is a diagram 900 of implementation of an SSL communication between clients and servers by a system for inspecting secure data, according to an example embodiment. A connection, such as a TCP connection 905, may be established between a client 210 and a client facing module 230, the client facing module 230 and a server facing module 235, and the server facing module 235 and a server 220. Therefore, the client facing module 230 may know that the client 210 may start a TSL connection, and the client facing module 230 may trigger establishment of the TLS connection immediately. Upon receiving a "Client Hello" message 910 from the client 210, the client facing module 230 may search for a forged security certificate in a security certificate cache. The client facing module 230 may determine that the forged security certificate related to the server 220 is absent in the security certificate cache. Upon such determination, the client facing module 230 may send a control message 915 to the server facing module 235. The control message may include an instruction for the server facing module 235 to fetch the security certificate from the server 220. The control message may be plugged as an extension into an application protocol message sent from the client facing module 230 to the server facing module 235. No separate connection may be needed for sending the control message 915. The server facing module 235 may perform processing of application protocol messages. Upon receipt of the control message 915, the server facing module 235 may start initiation of the TSL connection with the server 220 (through exchange of "Client Hello" message 920, "Server Hello" message 925, "Server Certificate" message 930, and other handshake messages 935) to obtain the security certificate from the server 220. The server facing module 235 may send a control message 940 to the client facing module 230. The control message 940 may include the security certificate obtained from the server 220 and may be plugged into the application protocol message. The client facing module 230 may process the application protocol messages in the same way as the server facing module 235. Upon receipt of the control message 940, the client facing module 230 may forge the security certificate and continue the handshake procedure through exchange of "Sever Hello" message 945 and other handshake messages 950 with the client 210. The connection used to retrieve the security certificate is not removed and may be used for passing an encrypted request 955 from the client 210 to the client facing module 230, passing the request 960 (upon decryption of the encrypted request 955 by the client facing module 230) from the client facing module 230 to monitoring devices 270, 280, from the monitoring devices 270, 280 to the server facing module 235, and passing an encrypted request 965 (upon encryption of the request 960 by the server facing module 235) from the server facing module 235 to the server 220.

Figure 10:
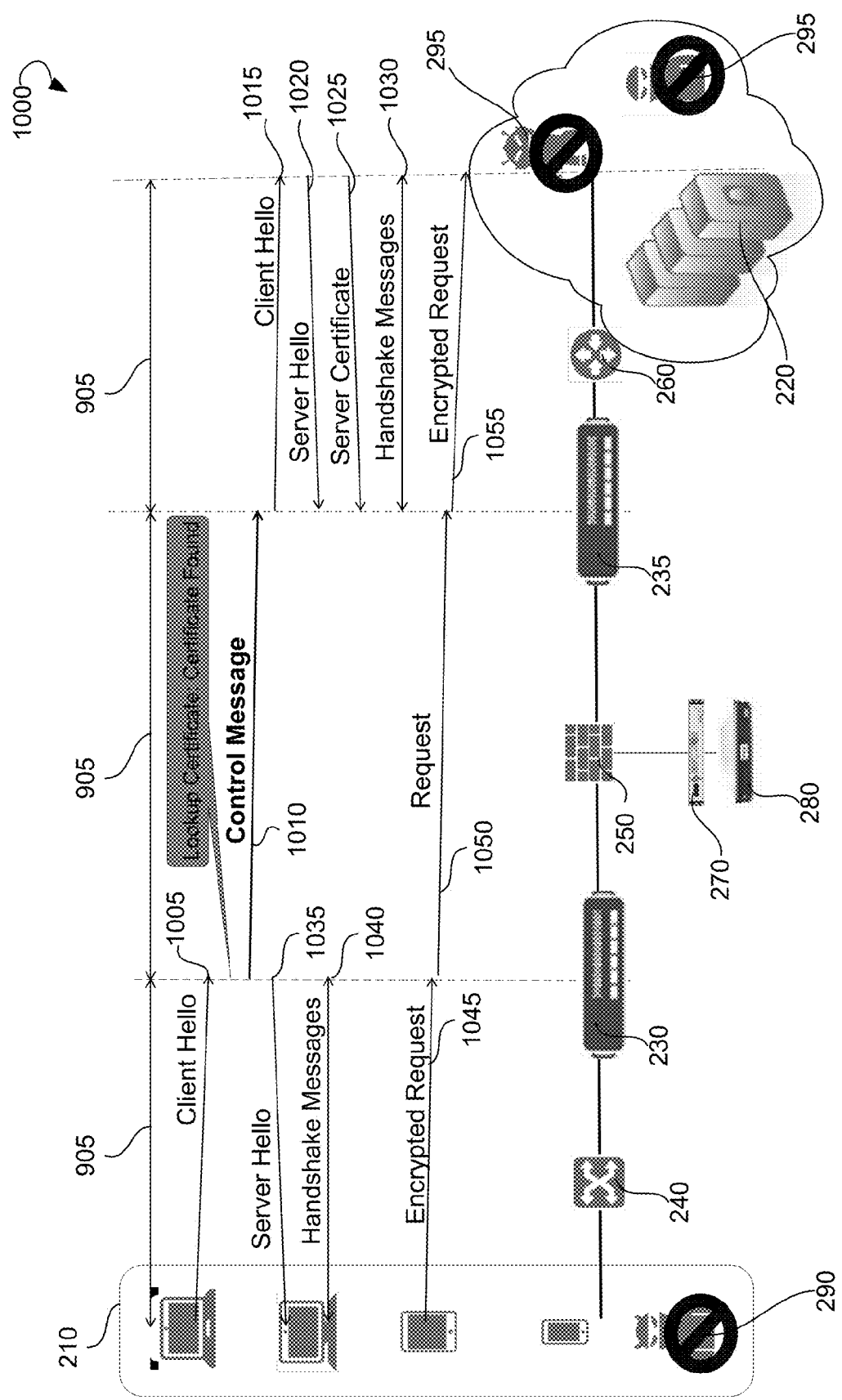
FIG. 10 is a diagram of implementation of an SSL communication between clients and servers by a system for inspecting secure data.

FIG. 10 is a diagram 1000 of implementation of an SSL communication between clients and servers by a system for inspecting secure data, according to another example embodiment. A connection, such as a TCP connection 905, may be established between a client 210 and a client facing module 230, the client facing module 230 and a server facing module 235, and the server facing module 235 and a server 220. Therefore, the client facing module 230 may know that the client 210 may start a TSL connection, and, the client facing module 230 may trigger establishment of the TLS connection immediately. Upon receiving of a "Client Hello" message 1005 from the client 210, the client facing module 230 may search for a forged security certificate in a security certificate cache. The client facing module 230 may determine that the forged security certificate related to the server 220 is present in the security certificate cache. Upon such determination, the client facing module 230 may send a control message 1010 to the server facing module 235. The control message 1010 may include an indication that the client facing module 230 has the security certificate associated with the server 220. The control message 1010 may trigger the server facing module 235 to initiate the TLS connection with the server 220. The server facing module 235 may establish the TLS connection with the server 220 through exchange of "Client Hello" message 1015, "Server Hello" message 1020, "Server Certificate" message 1025, and other handshake messages 1030.

The client facing module 230 may continue the handshake procedure with the client 210 through exchange of "Sever Hello" message 1035 and other handshake messages 1040 with the client 210. The connection used to send the control message 1010 is not removed and may be used for passing an encrypted request 1045 from the client 210 to the client facing module 230, passing the request 1050 (upon decryption of the encrypted request 1045 by the client facing module 230) from the client facing module 230 to monitoring devices 270, 280, and from the monitoring devices 270, 280 to the server facing module 235, and passing an encrypted request 1055 (upon encryption of the request 1050 by the server facing module 235) from the server facing module 235 to the server 220.

Figure 11:
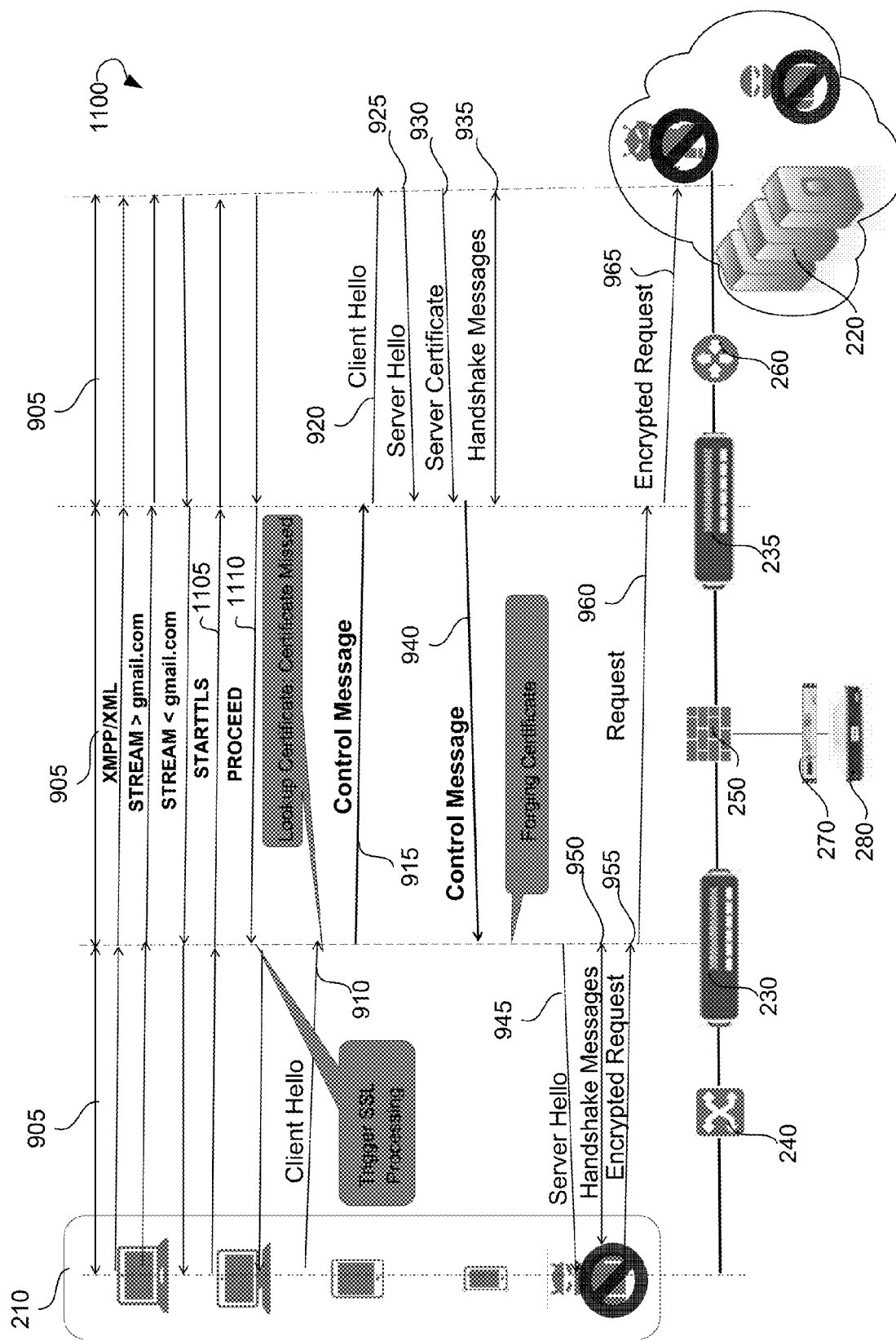
FIG. 11 is a diagram of implementation of an SSL communication using Extensible Messaging and Presence Protocol.

FIG. 11 is a diagram 1100 of implementation of an SSL communication for STARTTLS using XMPP protocol, according to an example embodiment. After the TCP connection 905 is established, a clear test message starts to flow from the client 210 to the server 220, and both the client facing module 230 and the server facing module 235 may work in an inspection mode. A STARTTLS request 1105 and a PROCEED response 1110 may trigger initiation of the TLS connection by the client facing module 230. After that, the process may flow exactly as the SSL communication for the case when the security certificate is absent in the security certificate cache, as shown on FIG. 9.

Figure 12:
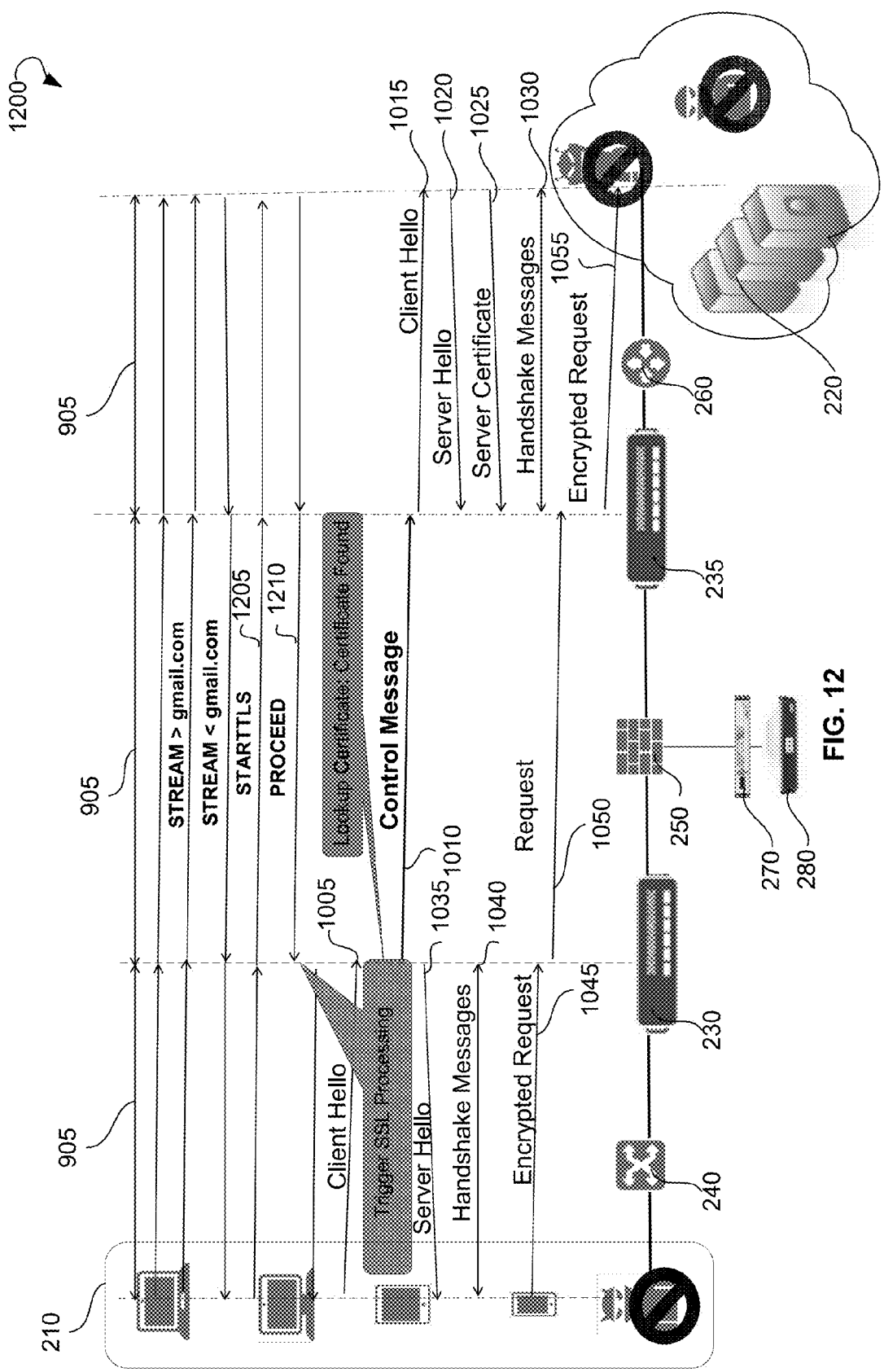
FIG. 12 is a diagram of implementation of an SSL communication using Extensible Messaging and Presence Protocol.

FIG. 12 is a diagram 1200 of implementation of an SSL communication for STARTTLS using XMPP protocol, according to another example embodiment. After the TCP connection 905 is established, a clear test message starts to flow from the client 210 to the server 220, and both the client facing module 230 and the server facing module 235 may work in an inspection mode. The STARTTLS request 1205 and the PROCEED response 1210 may trigger initiation of the TLS connection by the client facing module 230. After that, the process may flow exactly as the SSL communication for the case when the security certificate is present in the security certificate cache, as shown on FIG. 10.

Figure 13:
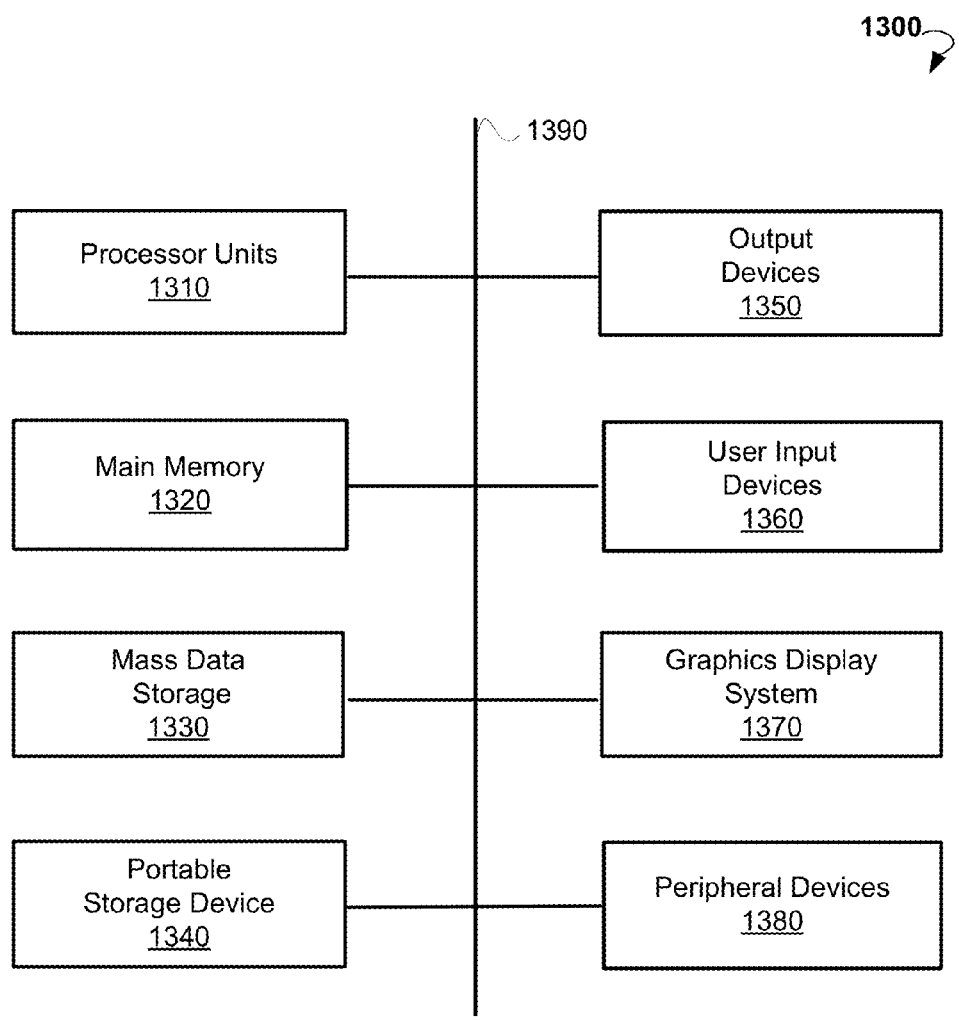
FIG. 13 shows a diagrammatic representation of a computing device for a machine, within which a set of instructions for causing the machine to perform any one or more of the methodologies discussed herein can be executed.

FIG. 13 illustrates a computer system 1300 that may be used to implement embodiments of the present disclosure, according to an example embodiment. The computer system 1300 may serve as a computing device for a machine, within which a set of instructions for causing the machine to perform any one or more of the methodologies discussed herein can be executed. The computer system 1300 can be implemented in the contexts of the likes of computing systems, networks, servers, or combinations thereof. The computer system 1300 includes one or more processor units 1310 and main memory 1320. Main memory 1320 stores, in part, instructions and data for execution by processor units 1310. Main memory 1320 stores the executable code when in operation. The computer system 1300 further includes a mass data storage 1330, a portable storage device 1340, output devices 1350, user input devices 1360, a graphics display system 1370, and peripheral devices 1380. The methods may be implemented in software that is cloud-based.

The components shown in FIG. 13 are depicted as being connected via a single bus 1390. The components may be connected through one or more data transport means. Processor units 1310 and main memory 1320 are connected via a local microprocessor bus, and mass data storage 1330, peripheral devices 1380, the portable storage device 1340, and graphics display system 1370 are connected via one or more I/O buses.

Mass data storage 1330, which can be implemented with a magnetic disk drive, solid state drive, or an optical disk drive, is a non-volatile storage device for storing data and instructions for use by processor units 1310. Mass data storage 1330 stores the system software for implementing embodiments of the present disclosure for purposes of loading that software into main memory 1320.

The portable storage device 1340 operates in conjunction with a portable non-volatile storage medium, such as a floppy disk, a compact disk, a Digital Versatile Disc (DVD), or USB storage device, to input and output data and code to and from the computer system 1300. The system software for implementing embodiments of the present disclosure is stored on such a portable medium and input to the computer system 1300 via the portable storage device 1340.

User input devices 1360 provide a portion of a user interface. User input devices 1360 include one or more microphones, an alphanumeric keypad, such as a keyboard, for inputting alphanumeric and other information, or a pointing device, such as a mouse, a trackball, stylus, or cursor direction keys. User input devices 1360 can also include a touchscreen. Additionally, the computer system 1300 includes output devices 1350. Suitable output devices include speakers, printers, network interfaces, and monitors.

Graphics display system 1370 includes a liquid crystal display or other suitable display device. Graphics display system 1370 receives textual and graphical information and processes the information for output to the display device. Peripheral devices 1380 may include any type of computer support device to add additional functionality to the computer system.

The components provided in the computer system 1300 of FIG. 13 are those typically found in computer systems that may be suitable for use with embodiments of the present disclosure and are intended to represent a broad category of such computer components that are well known in the art. Thus, the computer system 1300 can be a personal computer, handheld computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit, a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory disk, DVD, Blu-ray disc, any other optical storage medium, RAM, Programmable Read-Only Memory, Erasable Programmable Read-Only Memory, Electronically Erasable Programmable Read-Only Memory, flash memory, and/or any other memory chip, module, or cartridge.

In some embodiments, the computer system 1300 may be implemented as a cloud-based computing environment, such as a virtual machine operating within a computing cloud. In other embodiments, the computer system 1300 may itself include a cloud-based computing environment, where the functionalities of the computer system 1300 are executed in a distributed fashion. Thus, the computer system 1300, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 1300, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for inspecting secure data have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for inspecting secure data, the system comprising:
   a server facing device, the server facing device comprising a first hardware processor and a first memory, the server facing device being operable to:
     retrieve the security certificate from the server, the server facing device and the server being connected via a server-side encrypted connection; and
     receive the unencrypted data from the monitoring device via the data traffic channel upon the inspection of the unencrypted data by the monitoring device; and
   a client facing device in communication with the server facing device, the client facing device comprising a second hardware processor and a second memory, the client facing device being operable to:
     intercept a client request to establish a secure connection with a server, the client request being associated with the secure data;
     establish a data traffic channel between the client facing device and the server facing device associated with the server, the data traffic channel being unencrypted;
     send a control message to the server facing device via the data traffic channel, the control message including an instruction to the server facing device to obtain a security certificate from the server;
     receive, via the data traffic channel, from the server facing device, the security certificate, the security certificate being forged by the client facing device to establish a client-side encrypted connection between the client and the client facing device;
     upon establishing the client-side encrypted connection, receive the secure data from the client via the client-side encrypted connection, the secure data being encrypted by the client:
     decrypt the secure data to obtain unencrypted data; and
     send the unencrypted data to a monitoring device via the data traffic channel, the monitoring device including a third-party security device placed between the client facing device and the server facing device and communicating with each of the client facing device and the server facing device via the data traffic channel, wherein the unencrypted data is inspected by the monitoring device and sent by the monitoring device, upon the inspecting, to the server facing device;

wherein the server facing device is configured to:

upon receipt of the unencrypted data, re-encrypt the unencrypted data to obtain the secure data; and upon the re-encrypting, send the secure data to the server.

2. The system of claim 1, wherein the monitoring device is operable to inspect the unencrypted data.

3. The system of claim 1, wherein the client facing device is further operable to search for the security certificate associated with the server in a security certificate cache.

4. The system of claim 3, wherein the client facing device is further operable to provide a forged security certificate to the server facing device, the forged security certificate being associated with the security certificate found in the security certificate cache.

5. The system of claim 1, wherein the client facing device and the server facing device run on different partitions of a single device.

6. The system of claim 1, wherein each of the client facing device and the server facing device include a physical device.

7. The system of claim 1, wherein the control message is identified by an application protocol parser, the application protocol parser being installed on one or more of the client facing device and the server facing device.

8. The system of claim 1, wherein the control message is provided as an extension to an application protocol message, the application protocol message being sent between the client facing device and the server facing device.

9. The system of claim 1, wherein the server facing device is operable to:

receive the control message from the client facing device;

based on the control message, request the security certificate from the server; and provide the security certificate to the client facing device.

10. A method for inspecting secure data, the method comprising:

intercepting, by a client facing device, a client request to establish a secure connection with a server, the client request being associated with the secure data;

establishing, by the client facing device, a data traffic channel between the client facing device and a server facing device associated with the server, the data traffic channel being unencrypted;

sending, by the client facing device, a control message to the server facing device via the data traffic channel, the control message including an instruction to the server facing device to obtain a security certificate from the server;

retrieving, by the server facing device, the security certificate from the server, the server facing device and the server being connected via a server-side encrypted connection;

receiving, via the data traffic channel, by the client facing device, from the server facing device, the security certificate, the security certificate being forged by the client facing device to establish a client-side encrypted connection between the client and the client facing device;

upon establishing the client-side encrypted connection, receiving, by the client facing device, the secure data from the client via the client-side encrypted connection, the secure data being encrypted by the client;

decrypting, by the client facing device, the secure data to obtain unencrypted data;

sending, by the client facing device, the unencrypted data to a monitoring device via the data traffic channel, the monitoring device including a third-party security device placed between the client facing device and the server facing device and communicating with each of the client facing device and the server facing device via the data traffic channel, wherein the unencrypted data is inspected by the monitoring device and sent by the monitoring device, upon the inspecting, to the server facing device;

receiving, by the server facing device, the unencrypted data from the monitoring device via the data traffic channel upon the inspection of the unencrypted data by the monitoring device;

upon receipt of the unencrypted data, re-encrypting, by the server facing device, the unencrypted data to obtain the secure data; and upon the re-encrypting, sending, by the server facing device, the secure data to the server.

11. The method of claim 10, wherein the secure data is encrypted according to a Secure Socket Layer protocol.

12. The method of claim 10, further comprising searching, by the client facing device, for the security certificate associated with the server in a security certificate cache.

13. The method of claim 12, further comprising forging the security certificate found in the security certificate cache.

14. The method of claim 10, wherein the unencrypted data is inspected for malware or botnets.

15. The method of claim 10, wherein the control message is identified by an application protocol parser, the application protocol parser being installed on one or more of the client facing device and the server facing device.

16. The method of claim 10, wherein the control message is provided as an extension to an application protocol message, the application protocol message being sent between the client facing device and the server facing device.

17. A system for inspecting secure data, the system comprising:

a client facing device, the client facing device comprising a first hardware processor and a first memory, the client facing device being operable to:

intercept a client request to establish a secure connection with a server, the client request being associated with the secure data;

establish a data traffic channel between the client facing device and a server facing device associated with the server, the data traffic channel being unencrypted;

send a control message to the server facing device via the data traffic channel, the control message including an instruction to the server facing device to obtain a security certificate from the server;

search for the security certificate associated with the server in a security certificate cache;

forge the security certificate found in the security certificate cache to obtain the forged security certificate;

provide the forged security certificate to the server facing device;

retrieve the security certificate from the server, the server facing device and the server being connected via a server-side encrypted connection;

receive, via the data traffic channel, from the server facing device, the security certificate, the security certificate being forged by the client facing device to establish a client-side encrypted connection between the client and the client facing device;

upon establishing the client-side encrypted connection, receive the secure data from the client via the client-side encrypted connection, the secure data being encrypted by the client;

decrypt the secure data to obtain unencrypted data;

send the unencrypted data to a monitoring device via the data traffic channel, the monitoring device including a third-party security device placed between the client facing device and the server facing device and communicating with each of the client facing device and the server facing device via the data traffic channel, wherein the unencrypted data is inspected by the monitoring device and sent by the monitoring device, upon the inspecting, to the server facing device; and receive the unencrypted data from the monitoring device via the data traffic channel upon the inspection of the unencrypted data by the monitoring device; and the server facing device comprising a second hardware processor and a second memory, the server facing device being operable to:

receive the control message from the client facing device;

based on the control message, request the security certificate from the server;

provide the security certificate to the client facing device;

upon receipt of the unencrypted data, re-encrypt the unencrypted data to obtain the secure data after the unencrypted data is inspected; and send the secure data to the server.

\* \* \* \* \*